US007613629B2

(12) United States Patent
Antonucci et al.

(10) Patent No.: US 7,613,629 B2
(45) Date of Patent: *Nov. 3, 2009

(54) SYSTEM AND METHOD FOR THE TRANSFER OF LOYALTY POINTS

(75) Inventors: Donna A. Antonucci, Hoboken, NJ (US); Theodore S. Voltmer, Caldwell, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1143 days.

This patent is subject to a terminal disclaimer.

(21) Appl. No.: 10/304,251

(22) Filed: Nov. 26, 2002

(65) Prior Publication Data

US 2003/0130895 A1 Jul. 10, 2003

Related U.S. Application Data

(63) Continuation-in-part of application No. 09/836,213, filed on Apr. 17, 2001, now Pat. No. 7,398,225.

(60) Provisional application No. 60/279,817, filed on Mar. 29, 2001.

(51) Int. Cl.
G06Q 30/00 (2006.01)
(52) U.S. Cl. .............................. 705/14; 705/26; 705/27
(58) Field of Classification Search .................. 705/14, 705/26, 27
See application file for complete search history.

(56) References Cited

U.S. PATENT DOCUMENTS 4,087,660 A  5/1978  Sedley (Continued)

FOREIGN PATENT DOCUMENTS

JP  8235276  9/1996

(Continued)

OTHER PUBLICATIONS

See Attached PTO/SB/O8A Copies Which Were Previously Filed in the Parent Case: U.S. Appl. No. 09/836,213.

(Continued)

*Primary Examiner*—Raquel Alvarez
(74) *Attorney, Agent, or Firm*—Snell & Wilmer L.L.P.

(57) ABSTRACT

The present invention includes a loyalty program on a network-wide level, wherein the program facilitates a transfer of loyalty points from at least one consumer account associated with a sponsoring company to at least one consumer account associated with a host company. In one embodiment, the invention analyzes the loyalty point balances of consumer accounts associated with a sponsoring company, and based upon certain criteria or rules, the system determines particular loyalty point balances which are below a certain threshold amount or which have remained inactive for a certain time period. After determining particular consumer accounts which meet the criteria or rules, the system establishes a new host account in a host system for each qualifying consumer. The system then deducts all or any portion of the remaining loyalty point balance in the particular consumer's sponsored account and credits the corresponding host account with a corresponding loyalty point balance. By transferring the consumer accounts to a host system, the sponsoring company eliminates or reduces the loyalty point balances from its system, thereby reducing the sponsoring company accounting liabilities and providing new options for the consumers to redeem the points.

7 Claims, 7 Drawing Sheets

U.S. PATENT DOCUMENTS

| | | | |
|---|---|---|---|
| 4,358,672 A | 11/1982 | Hyatt et al. | |
| 4,473,825 A | 9/1984 | Walton | |
| 4,546,241 A | 10/1985 | Walton | |
| 4,609,812 A | 9/1986 | Drexler | |
| 4,634,848 A | 1/1987 | Shinohara et al. | |
| 4,910,672 A | 3/1990 | Off et al. | |
| 5,025,372 A | 6/1991 | Burton et al. | |
| 5,056,019 A | 10/1991 | Schultz et al. | |
| 5,117,355 A | 5/1992 | McCarthy | |
| 5,128,752 A | 7/1992 | Von Kohorn | |
| 5,173,851 A | 12/1992 | Off et al. | |
| 5,200,889 A | 4/1993 | Mori | |
| 5,201,010 A | 4/1993 | Deaton et al. | |
| 5,202,826 A | 4/1993 | McCarthy | |
| 5,233,514 A | 8/1993 | Ayyoubi et al. | |
| 5,237,620 A | 8/1993 | Deaton et al. | |
| 5,256,863 A | 10/1993 | Ferguson et al. | |
| 5,287,268 A | 2/1994 | McCarthy | |
| 5,305,196 A | 4/1994 | Deaton et al. | |
| 5,327,508 A | 7/1994 | Deaton et al. | |
| 5,353,218 A | 10/1994 | De Lapa et al. | |
| 5,382,779 A | 1/1995 | Gupta | |
| 5,388,165 A | 2/1995 | Deaton et al. | |
| 5,424,524 A | 6/1995 | Ruppert et al. | |
| 5,430,644 A | 7/1995 | Deaton et al. | |
| 5,434,394 A | 7/1995 | Roach et al. | |
| 5,448,471 A | 9/1995 | Deaton et al. | |
| 5,467,269 A | 11/1995 | Flaten | |
| 5,471,669 A | 11/1995 | Lidman | |
| 5,477,038 A | 12/1995 | Levine et al. | |
| 5,483,444 A | 1/1996 | Heintzeman et al. | |
| 5,491,326 A | 2/1996 | Marceau et al. | |
| 5,502,636 A | 3/1996 | Clarke | |
| 5,513,102 A | 4/1996 | Auriemma | |
| 5,535,407 A | 7/1996 | Yanagawa et al. | |
| 5,537,314 A | 7/1996 | Kanter | |
| 5,559,313 A | 9/1996 | Claus et al. | |
| 5,592,560 A | 1/1997 | Deaton et al. | |
| 5,612,868 A | 3/1997 | Off et al. | |
| 5,621,812 A | 4/1997 | Deaton et al. | |
| 5,638,457 A | 6/1997 | Deaton et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,649,115 A | 7/1997 | Schrader et al. | |
| 5,659,469 A | 8/1997 | Deaton et al. | |
| 5,673,322 A | 9/1997 | Pepe et al. | |
| 5,675,662 A | 10/1997 | Deaton et al. | |
| 5,677,952 A | 10/1997 | Blakley, III et al. | |
| 5,687,322 A | 11/1997 | Deaton et al. | |
| 5,689,100 A | 11/1997 | Carrithers et al. | |
| 5,708,782 A | 1/1998 | Larson et al. | |
| 5,710,886 A | 1/1998 | Christensen et al. | |
| 5,715,399 A | 2/1998 | Bezoz | |
| 5,729,693 A | 3/1998 | Holda-Fleck | |
| 5,734,838 A | 3/1998 | Robinson et al. | |
| 5,742,845 A | 4/1998 | Wagner | |
| 5,749,075 A | 5/1998 | Toader et al. | |
| 5,761,648 A | 6/1998 | Golden et al. | |
| 5,765,141 A | 6/1998 | Spector | |
| 5,774,868 A | 6/1998 | Cragun et al. | |
| 5,774,869 A | 6/1998 | Toader | |
| 5,774,870 A | 6/1998 | Storey | |
| 5,794,230 A | 8/1998 | Horadan et al. | |
| 5,802,275 A | 9/1998 | Blonder | |
| 5,806,043 A | 9/1998 | Toader | |
| 5,806,044 A | 9/1998 | Powell | |
| 5,806,045 A | 9/1998 | Biorge et al. | |
| 5,814,796 A | 9/1998 | Benson et al. | |
| 5,816,918 A | 10/1998 | Kelly et al. | |
| 5,822,230 A | 10/1998 | Kikinis et al. | |
| 5,832,457 A | 11/1998 | O'Brien et al. | |
| 5,832,458 A | 11/1998 | Jones | |
| 5,834,748 A | 11/1998 | Litman | |
| 5,839,117 A | 11/1998 | Cameron et al. | |
| 5,844,230 A | 12/1998 | Lalonde | |
| 5,845,259 A | 12/1998 | West et al. | |
| 5,848,399 A | 12/1998 | Burke | |
| 5,855,007 A | 12/1998 | Jovicic et al. | |
| 5,857,175 A | 1/1999 | Day et al. | |
| 5,864,822 A | 1/1999 | Baker, III | |
| RE36,116 E | 2/1999 | McCarthy | |
| 5,870,722 A | 2/1999 | Albert et al. | |
| 5,884,277 A | 3/1999 | Khosla | |
| 5,892,827 A | 4/1999 | Beach et al. | |
| 5,892,900 A | 4/1999 | Ginter et al. | |
| 5,892,905 A | 4/1999 | Brandt et al. | |
| 5,898,838 A | 4/1999 | Wagner | |
| 5,903,874 A | 5/1999 | Leonard et al. | |
| 5,903,880 A | 5/1999 | Biffar | |
| 5,905,246 A | 5/1999 | Fajkowski | |
| 5,905,908 A | 5/1999 | Wagner | |
| 5,907,830 A | 5/1999 | Engel et al. | |
| 5,907,831 A | 5/1999 | Lotvin et al. | |
| 5,909,023 A | 6/1999 | Ono et al. | |
| 5,913,210 A | 6/1999 | Call | |
| 5,915,007 A | 6/1999 | Klapka | |
| 5,915,019 A | 6/1999 | Ginter et al. | |
| 5,915,243 A | 6/1999 | Smolen | |
| 5,915,244 A | 6/1999 | Jack et al. | |
| 5,918,211 A | 6/1999 | Sloane | |
| 5,918,213 A | 6/1999 | Bernard et al. | |
| 5,918,214 A | 6/1999 | Perkowski | |
| 5,920,847 A | 7/1999 | Kolling et al. | |
| 5,923,016 A | 7/1999 | Fredregill et al. | |
| 5,933,811 A | 8/1999 | Angles et al. | |
| 5,937,391 A * | 8/1999 | Ikeda et al. | 705/14 |
| 5,937,394 A | 8/1999 | Wong et al. | |
| 5,938,727 A | 8/1999 | Ikeda | |
| 5,940,506 A | 8/1999 | Chang et al. | |
| 5,950,173 A | 9/1999 | Perkowski | |
| 5,952,638 A | 9/1999 | Demers et al. | |
| 5,953,005 A | 9/1999 | Liu | |
| 5,956,695 A | 9/1999 | Carrithers et al. | |
| 5,956,700 A | 9/1999 | Landry | |
| 5,964,830 A | 10/1999 | Durrett | |
| 5,970,469 A | 10/1999 | Scroggie et al. | |
| 5,971,277 A | 10/1999 | Cragun et al. | |
| 5,974,398 A | 10/1999 | Hanson et al. | |
| 5,978,777 A | 11/1999 | Garnier | |
| 5,979,757 A | 11/1999 | Tracy et al. | |
| 5,982,520 A | 11/1999 | Weiser et al. | |
| 5,983,196 A | 11/1999 | Wendkos | |
| 5,983,205 A | 11/1999 | Brams | |
| 5,984,191 A | 11/1999 | Chapin, Jr. | |
| 5,988,500 A | 11/1999 | Litman | |
| 5,991,376 A | 11/1999 | Hennessy et al. | |
| 5,991,736 A | 11/1999 | Ferguson et al. | |
| 5,992,738 A | 11/1999 | Matsumoto et al. | |
| 5,992,752 A | 11/1999 | Wilz, Sr. et al. | |
| 5,995,942 A | 11/1999 | Smith et al. | |
| 5,999,914 A | 12/1999 | Blinn et al. | |
| 6,000,608 A | 12/1999 | Dorf | |
| 6,002,771 A | 12/1999 | Nielsen | |
| 6,003,013 A | 12/1999 | Boushy et al. | |
| 6,007,426 A | 12/1999 | Kelly et al. | |
| 6,009,411 A | 12/1999 | Kepecs | |
| 6,009,412 A | 12/1999 | Storey | |
| 6,012,038 A | 1/2000 | Powell | |
| 6,012,039 A | 1/2000 | Hoffman et al. | |
| 6,012,051 A | 1/2000 | Sammon, Jr. et al. | |
| 6,012,636 A | 1/2000 | Smith | |
| 6,014,634 A | 1/2000 | Scroggie et al. | |
| 6,014,635 A | 1/2000 | Harris et al. | |

| | | | | | | |
|---|---|---|---|---|---|---|
| 6,015,344 | A | 1/2000 | Kelly et al. | 6,251,017 B1 | 6/2001 | Leason et al. |
| 6,016,476 | A | 1/2000 | Maes et al. | 6,267,672 B1 | 7/2001 | Vance |
| 6,018,695 | A | 1/2000 | Ahrens et al. | 6,289,322 B1 | 9/2001 | Kitchen et al. |
| 6,018,718 | A | 1/2000 | Walker et al. | 6,292,786 B1 | 9/2001 | Deaton et al. |
| 6,018,724 | A | 1/2000 | Arent | 6,298,335 B1 | 10/2001 | Bernstein |
| 6,021,399 | A | 2/2000 | Demers et al. | 6,332,126 B1 | 12/2001 | Peirce et al. |
| 6,024,640 | A | 2/2000 | Walker et al. | 6,332,157 B1 | 12/2001 | Mighdoli et al. |
| 6,026,370 | A | 2/2000 | Jermyn | 6,334,111 B1 | 12/2001 | Carrott |
| 6,026,375 | A | 2/2000 | Hall et al. | 6,336,098 B1 | 1/2002 | Fortenberry et al. |
| 6,026,377 | A | 2/2000 | Burke | 6,363,362 B1 | 3/2002 | Burfield et al. |
| 6,032,133 | A | 2/2000 | Hilt et al. | 6,386,444 B1 | 5/2002 | Sullivan |
| 6,032,136 | A | 2/2000 | Brake, Jr. et al. | 6,402,029 B1 | 6/2002 | Gangi |
| 6,035,280 | A | 3/2000 | Christensen | 6,408,284 B1 | 6/2002 | Hilt et al. |
| 6,035,281 | A | 3/2000 | Crosskey et al. | 6,438,527 B1 | 8/2002 | Powar |
| 6,038,321 | A | 3/2000 | Torigai et al. | 6,450,407 B1 | 9/2002 | Freeman et al. |
| 6,039,244 | A | 3/2000 | Finsterwald | 6,452,498 B2 | 9/2002 | Stewart |
| 6,041,308 | A | 3/2000 | Walker et al. | 6,484,147 B1 * | 11/2002 | Brizendine et al. ............ 705/14 |
| 6,041,309 | A | 3/2000 | Laor | 6,484,940 B1 | 11/2002 | Dilday et al. |
| 6,044,360 | A | 3/2000 | Picciallo | 6,486,768 B1 | 11/2002 | French et al. |
| 6,047,269 | A | 4/2000 | Biffar | 6,510,998 B1 | 1/2003 | Stanford et al. |
| 6,049,778 | A | 4/2000 | Walker et al. | 6,522,889 B1 | 2/2003 | Aarnio |
| 6,049,779 | A | 4/2000 | Berkson | 6,532,448 B1 | 3/2003 | Higginson et al. |
| 6,055,573 | A | 4/2000 | Gardenswartz et al. | 6,578,015 B1 | 6/2003 | Haseltine et al. |
| 6,058,371 | A | 5/2000 | Dijan | 6,594,640 B1 | 7/2003 | Postrel |
| 6,058,482 | A | 5/2000 | Liu | 6,609,150 B2 | 8/2003 | Lee et al. |
| 6,061,660 | A | 5/2000 | Eggleston et al. | 6,631,358 B1 | 10/2003 | Ogilvie |
| 6,064,979 | A | 5/2000 | Perkowski | 6,631,849 B2 | 10/2003 | Blossom |
| 6,065,120 | A | 5/2000 | Laursen et al. | 6,687,679 B1 | 2/2004 | Van Luchene et al. |
| 6,072,468 | A | 6/2000 | Hocker et al. | 6,721,743 B1 | 4/2004 | Sakakibara |
| 6,073,840 | A | 6/2000 | Marion | 6,748,365 B1 | 6/2004 | Quinlan et al. |
| 6,075,863 | A | 6/2000 | Krishnan et al. | 6,820,061 B2 | 11/2004 | Postrel |
| 6,076,101 | A | 6/2000 | Kamakura et al. | 6,826,594 B1 | 11/2004 | Pettersen |
| 6,078,898 | A | 6/2000 | Davis et al. | 6,829,586 B2 | 12/2004 | Postrel |
| 6,081,900 | A | 6/2000 | Subramaniam et al. | 6,842,739 B2 | 1/2005 | Postrel |
| 6,088,730 | A | 7/2000 | Kato et al. | 6,856,976 B2 | 2/2005 | Bible et al. |
| 6,092,069 | A | 7/2000 | Johnson et al. | 6,898,570 B1 | 5/2005 | Tedesco et al. |
| 6,092,201 | A | 7/2000 | Turnbull et al. | 6,931,538 B1 | 8/2005 | Sawaguchi |
| 6,094,486 | A | 7/2000 | Marchant | 6,947,898 B2 | 9/2005 | Postrel |
| 6,101,483 | A | 8/2000 | Petrovich et al. | 6,985,876 B1 | 1/2006 | Lee |
| 6,101,484 | A | 8/2000 | Halbert et al. | 7,025,674 B2 | 4/2006 | Adams et al. |
| 6,101,485 | A | 8/2000 | Fortenberry et al. | 7,043,752 B2 | 5/2006 | Royer et al. |
| 6,105,001 | A | 8/2000 | Masi et al. | 7,096,190 B2 | 8/2006 | Postrel |
| 6,105,865 | A | 8/2000 | Hardesty | 7,127,414 B1 | 10/2006 | Awadallah et al. |
| 6,115,737 | A | 9/2000 | Ely et al. | 7,187,947 B1 | 3/2007 | White et al. |
| 6,119,230 | A | 9/2000 | Carter | 7,249,197 B1 | 7/2007 | Roestenburg et al. |
| 6,128,599 | A | 10/2000 | Walker et al. | 7,289,970 B1 | 10/2007 | Siegel |
| 6,128,603 | A | 10/2000 | Dent et al. | 7,290,061 B2 | 10/2007 | Lentini et al. |
| 6,129,274 | A | 10/2000 | Suzuki | 7,321,901 B1 | 1/2008 | Blinn et al. |
| 6,131,810 | A | 10/2000 | Weiss et al. | 7,349,867 B2 | 3/2008 | Rollins et al. |
| 6,134,318 | A | 10/2000 | O'Neil | 2001/0032137 A1 | 10/2001 | Bennett et al. |
| 6,134,548 | A | 10/2000 | Gottsman et al. | 2001/0032182 A1 | 10/2001 | Kumar et al. |
| 6,138,911 | A | 10/2000 | Fredregill et al. | 2001/0032183 A1 | 10/2001 | Landry |
| 6,141,161 | A | 10/2000 | Sato et al. | 2001/0034653 A1 | 10/2001 | Yamamoto |
| 6,145,739 | A | 11/2000 | Bertina et al. | 2001/0034720 A1 | 10/2001 | Armes |
| 6,148,405 | A | 11/2000 | Liao et al. | 2001/0037295 A1 | 11/2001 | Olsen |
| 6,154,214 | A | 11/2000 | Uyehara et al. | 2001/0047342 A1 | 11/2001 | Cuervo |
| 6,161,096 | A | 12/2000 | Bell | 2001/0054003 A1 | 12/2001 | Chien et al. |
| 6,164,533 | A | 12/2000 | Barton | 2002/0013728 A1 | 1/2002 | Wilkman |
| 6,173,267 | B1 | 1/2001 | Cairns | 2002/0016734 A1 | 2/2002 | McGill et al. |
| 6,178,407 | B1 | 1/2001 | Lotvin et al. | 2002/0026348 A1 | 2/2002 | Fowler et al. |
| 6,178,408 | B1 | 1/2001 | Copple et al. | 2002/0046110 A1 | 4/2002 | Gallagher |
| 6,182,894 | B1 | 2/2001 | Hackett et al. | 2002/0049631 A1 | 4/2002 | Williams |
| 6,185,541 | B1 | 2/2001 | Scroggie et al. | 2002/0052940 A1 | 5/2002 | Myers et al. |
| 6,189,103 | B1 | 2/2001 | Nevarez et al. | 2002/0055874 A1 | 5/2002 | Cohen |
| 6,195,677 | B1 | 2/2001 | Utsumi | 2002/0056044 A1 | 5/2002 | Andersson |
| 6,196,458 | B1 | 3/2001 | Walker et al. | 2002/0062253 A1 | 5/2002 | Dosh, Jr. et al. |
| 6,199,099 | B1 | 3/2001 | Gershman et al. | 2002/0069109 A1 | 6/2002 | Wendkos |
| 6,216,129 | B1 | 4/2001 | Eldering | 2002/0069150 A1 | 6/2002 | Ni |
| 6,222,914 | B1 | 4/2001 | McMullin | 2002/0075844 A1 | 6/2002 | Hagen |
| 6,236,978 | B1 | 5/2001 | Tuzhilin | 2002/0077890 A1 | 6/2002 | LaPointe et al. |
| 6,243,688 | B1 | 6/2001 | Kalina | 2002/0077978 A1 | 6/2002 | OLeary et al. |
| 6,249,772 | B1 | 6/2001 | Walker et al. | 2002/0082918 A1 | 6/2002 | Warwick |
| 6,249,773 | B1 | 6/2001 | Allard et al. | 2002/0082920 A1 | 6/2002 | Austin et al. |

| | | | |
|---|---|---|---|
| 2002/0082990 | A1 | 6/2002 | Jones |
| 2002/0087468 | A1 | 7/2002 | Ganesan et al. |
| 2002/0091593 | A1 | 7/2002 | Fowler |
| 2002/0095365 | A1 | 7/2002 | Slavin et al. |
| 2002/0107733 | A1 | 8/2002 | Liu et al. |
| 2002/0111919 | A1 | 8/2002 | Weller et al. |
| 2002/0120513 | A1 | 8/2002 | Webb et al. |
| 2002/0123949 | A1 | 9/2002 | VanLeeuwen |
| 2002/0143614 | A1 | 10/2002 | MacLean et al. |
| 2002/0146018 | A1 | 10/2002 | Kailamaki et al. |
| 2002/0152116 | A1 | 10/2002 | Yan et al. |
| 2002/0161630 | A1 | 10/2002 | Kern et al. |
| 2002/0194069 | A1 | 12/2002 | Thakur et al. |
| 2003/0004802 | A1 | 1/2003 | Callegari |
| 2003/0004808 | A1 | 1/2003 | Elhaoussine et al. |
| 2003/0009379 | A1 | 1/2003 | Narasimhan et al. |
| 2003/0013438 | A1 | 1/2003 | Darby |
| 2003/0036425 | A1 | 2/2003 | Kaminkow et al. |
| 2003/0040964 | A1 | 2/2003 | Lacek |
| 2003/0055722 | A1 | 3/2003 | Perreault et al. |
| 2003/0061097 | A1 | 3/2003 | Walker et al. |
| 2003/0069787 | A1 | 4/2003 | Tendon et al. |
| 2003/0069842 | A1 | 4/2003 | Kight et al. |
| 2003/0074311 | A1 | 4/2003 | Saylors et al. |
| 2003/0087650 | A1 | 5/2003 | Aarnio |
| 2003/0101131 | A1 | 5/2003 | Warren et al. |
| 2003/0115456 | A1 | 6/2003 | Kapoor |
| 2003/0130948 | A1 | 7/2003 | Algiene et al. |
| 2003/0163425 | A1 | 8/2003 | Cannon, Jr. |
| 2003/0187762 | A1 | 10/2003 | Coyle |
| 2003/0200142 | A1 | 10/2003 | Hicks et al. |
| 2003/0200144 | A1 | 10/2003 | Antonucci et al. |
| 2003/0208445 | A1 | 11/2003 | Compiano |
| 2003/0216960 | A1 | 11/2003 | Postrel |
| 2003/0216967 | A1 | 11/2003 | Williams |
| 2003/0229584 | A1 | 12/2003 | Brown |
| 2004/0015438 | A1 | 1/2004 | Compiano et al. |
| 2004/0019522 | A1 | 1/2004 | Bortolin et al. |
| 2004/0019560 | A1 | 1/2004 | Evans et al. |
| 2004/0035923 | A1 | 2/2004 | Kahr |
| 2004/0039644 | A1 | 2/2004 | Postrel |
| 2004/0039692 | A1 | 2/2004 | Shields et al. |
| 2004/0049439 | A1 | 3/2004 | Johnston et al. |
| 2004/0068438 | A1 | 4/2004 | Mitchell et al. |
| 2004/0078273 | A1 | 4/2004 | Loeb et al. |
| 2004/0097287 | A1 | 5/2004 | Postrel |
| 2004/0098317 | A1 | 5/2004 | Postrel |
| 2004/0107140 | A1 | 6/2004 | Postrel |
| 2004/0128197 | A1 | 7/2004 | Bam et al. |
| 2004/0215505 | A1 | 10/2004 | Sullivan |
| 2004/0220854 | A1 | 11/2004 | Postrel |
| 2004/0262381 | A1 | 12/2004 | Mesaros |
| 2005/0021399 | A1 | 1/2005 | Postrel |
| 2005/0021400 | A1 | 1/2005 | Postrel |
| 2005/0021401 | A1 | 1/2005 | Postrel |
| 2005/0021457 | A1 | 1/2005 | Johnson et al. |
| 2005/0060225 | A1 | 3/2005 | Postrel |
| 2005/0080727 | A1 | 4/2005 | Postrel |
| 2005/0149394 | A1 | 7/2005 | Postrel |
| 2005/0240472 | A1 | 10/2005 | Postrel |
| 2006/0004629 | A1 | 1/2006 | Neemann et al. |
| 2006/0020511 | A1 | 1/2006 | Postrel |
| 2007/0239523 | A1 | 10/2007 | Yi |

FOREIGN PATENT DOCUMENTS

| | | |
|---|---|---|
| JP | 2003132224 | 5/2003 |
| WO | WO9923176 | 5/1999 |
| WO | WO9930256 | 6/1999 |
| WO | WO9952051 | 10/1999 |
| WO | WO9960503 | 11/1999 |
| WO | WO0014665 | 3/2000 |
| WO | WO0033159 | 6/2000 |
| WO | WO0033222 | 6/2000 |
| WO | WO0101282 | 1/2001 |
| WO | WO0152078 | 7/2001 |

OTHER PUBLICATIONS

Fallon: "UK Retailers' Loyal Customer 'Card Wars' Prove Costly (Most major retailers in the UK have grown their sales over the past 2 years by launching loyalty-card programs)", Supermarket News, May 5, 1997; vol. 47, No. 18, p. 57.

Dialog file 9, #001824832 "UK Retailers loyal Customers' card Wars' Prove Costly" Supermarket News, V47, N18, p. 57+, May 5, 1997.

Visa International, New Technologies [online]. 2000 [retrieved on Jun. 19, 2008]. Retrieved from Internet: <URL:http://web.archive.org/web/20000605185829/visa.com/nt/chip/main.html>.

WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.

Non-Final Office Action mailed Sep. 10, 2008 in U.S. Appl. No. 10/708,570.

Non-Final Office Action mailed Sep. 9, 2008 in U.S. Appl. No. 10/708,568.

Non-Final Office Action mailed Nov. 29, 2004 in U.S. Appl. No. 09/834,478.

Final Office Action mailed May 11, 2005 in U.S. Appl. No. 09/834,478.

Advisory Action mailed Jan. 9, 2006 in U.S. Appl. No. 09/834,478.

Non-Final Office Action mailed May 9, 2006 in U.S. Appl. No. 09/834,478.

Final Rejection mailed Dec. 28, 2006 in U.S. Appl. No. 09/834,478.

Advisory Action mailed Mar. 2, 2007 in U.S. Appl. No. 09/834,478.

Non-Final Office Action mailed May 10, 2007 in U.S. Appl. No. 09/834,478.

Final Office Action mailed Nov. 7, 2007 in U.S. Appl. No. 09/834,478.

Advisory Action mailed Feb. 25, 2008 in U.S. Appl.No. 09/834,478.

Non-Final Office Action mailed Jun. 2, 2008 in U.S. Appl. No. 09/834,478.

Final Office Action mailed Dec. 29, 2008 in U.S. Appl. No. 09/834,478.

Notice of Allowance mailed Feb. 5, 2008 in U.S. Appl. No. 09/836,213.

Notice of Allowance mailed Jun. 17, 2008 in U.S. Appl. No. 11/619,512.

Notice of Allowance mailed Oct. 22, 2008 in U.S. Appl. No. 11/619,523.

Requirement for Restriction mailed Dec. 8, 2008 in U.S. Appl. No. 11/276,800.

Non-Final Office Action mailed Dec. 31, 2008 in U.S. Appl. No. 11/276,800.

Non-Final Office Action mailed Aug. 8, 2007 in U.S. Appl. No. 11/695,911.

Final Office Action mailed Jan. 24, 2008 in U.S. Appl. No. 11/695,911.

Advisory Action mailed Mar. 27, 2008 in U.S. Appl. No. 11/695,911.

Non-Final Office Action mailed Jul. 15, 2008 in U.S. Appl. No. 11/695,911.

Final Office Action mailed Jan. 28, 2009 in U.S. Appl. No. 11/695,911.

Requirement for Restriction mailed Sep. 25, 2006 in U.S. Appl. No. 10/027,984.

Non-Final Office Action mailed Jan. 30, 2007 in U.S. Appl. No. 10/027,984.

Final Office Action mailed Aug. 9, 2007 in U.S. Appl. No. 10/027,984.

Non-Final Office Action mailed Apr. 3, 2008 in U.S. Appl. No. 10/027,984.

Non-Final Office Action mailed Oct. 17, 2008 in U.S. Appl. No. 10/027,984.

Notice of Allowance mailed Feb. 5, 2008 in U.S. Appl. No. 10/010,947.

Non-Final Office Action mailed Jun. 27, 2008 in U.S. Appl. No. 11/458,019.
Final Office Action mailed Jan. 7, 2009 in U.S. Appl. No. 11/458,019.
Notice of Allowance mailed Aug. 22, 2008 in U.S. Appl. No. 10/378,456.
Non-Final Office Action mailed Aug. 18, 2008 in U.S. Appl. No. 11/548,203.
ISR and Written Opinion mailed Jan. 10, 2002 in PCT/US01/012219.
ISR and Written Opinion mailed Oct. 2, 2002 in PCT/US02/008408.
Notice of Allowance mailed Apr. 5, 2007 in U.S. Appl. No. 10/084,744.
ISR and Written Opinion mailed Jan. 12, 2005 in PCT/US04/04457.
ISR and Written Opinion mailed Mar. 23, 2000 in PCT/US05/30792.
ISR and Written Opinion mailed Jul. 16, 2008 in PCT/US07/78253.

* cited by examiner

SYSTEM AND METHOD FOR THE TRANSFER OF LOYALTY POINTS

CROSS REFERENCE TO RELATED APPLICATIONS

This application claims priority to, and is a continuation-in-part of, U.S. patent application Ser. No. 09/836,213, filed Apr. 17, 2001 and entitled "System and Method for Networked Loyalty Program", now U.S. Pat. No. 7,398,225 which claims priority to, and the benefit of, U.S. Provisional Application Ser. No. 60/279,817, filed Mar. 29, 2001 and entitled "System and Method for Networked Incentive Awards Program". This application hereby incorporates by reference both of these prior applications in their entireties.

FIELD OF THE INVENTION

The present invention relates generally to incentive and awards redemption programs and, more specifically, to the transfer of loyalty point balances from sponsored loyalty accounts to loyalty point accounts of a particular host.

BACKGROUND OF THE INVENTION

Incentive award programs have been developed in a variety of industries to promote customer loyalty. Generally, such programs reward customers for repeat business with the same merchant or service provider by accumulating reward points which can then be redeemed in a plurality of ways, including exchanging the reward points for additional goods and services that may be selected from an approved list or a redemption catalog for example. The reward points are usually calculated using a predetermined formula or ratio that relates a customer's purchase volume (i.e., in terms of money value or some other volume parameter) to a certain number of reward points. For example, reward points may be issued on a one-for-one basis with each dollar that a customer spends on particular goods and services.

One well-known example of a customer incentive program is a "frequent flyer" program which rewards airlines passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating reward points or dollar value points based upon the volume of purchases made using the particular financial instrument. These types of programs may be designed such that customers of the financial institution accumulate reward points which can be redeemed for selected goods or services or, alternatively, such that customers accumulate points which have a dollar value which can be applied toward a credit or debit balance, depending on whether the instrument is a credit or debit instrument, for example.

These and other similar incentive award programs are described in U.S. Pat. Nos. 5,774,870 and 6,009,412, issued to Thomas W. Storey and assigned to Netcentives, Inc., both of which are hereby incorporated by reference to the extent that they describe an automated rewards system. For more information on loyalty systems, transaction systems, electronic commerce systems, and digital wallet systems, see, for example, the Shop AMEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional applications Ser. No. 60/187,620 filed Mar. 7, 2000, Ser. No. 60/200,625 filed Apr. 28, 2000, and Ser. No. 60/213,323 filed May 22, 2000, all of which are herein incorporated by reference. Other examples of online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference. A further example of a loyalty and reward program may be found at the AIR MILES® Web site (www.airmiles.ca), which describes a loyalty program offered by The Loyalty Group, a privately held division of Alliance Data Systems of Dallas, Tex., and which is hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; all of which are hereby incorporated by reference. Information on point-of-sale systems and the exploitation of point-of-sale data is disclosed in U.S. Pat. No. 5,832,457, issued on Nov. 3, 1998 to O'Brien et al., which is hereby incorporated by reference.

To promote loyalty to a particular company, many of the above-described loyalty programs are sponsored by and operated by a company such that the consumers are typically required to earn and burn the loyalty points through the same company. As such, a particular sponsoring company may market its own loyalty points under a particular trademark (e.g., Membership Rewards sponsored by American Express, DeltaMiles sponsored by Delta Airlines, Hilton Rewards sponsored by Hilton Hotels, ePloids sponsored by Frito-Lay and FlightFund sponsored by AmericaWest Airlines) and maintain loyalty point accounts for each consumer, wherein the accounts include only loyalty points associated with the sponsoring company. Accordingly, the consumers in the sponsoring company loyalty program typically earn loyalty points from the sponsoring company, then the consumers spend the sponsored loyalty points on reward items offered by the sponsoring company.

However, it is often difficult for an individual sponsoring company to offer a sufficiently wide range of reward items to satisfy the varied interests of its consumers. Moreover, many of the consumers may only engage in a limited amount of business with the particular sponsoring company and/or may only earn a limited amount of sponsored loyalty points from the sponsoring company. As such, a consumer's loyalty point account with the sponsoring company may include a minimal amount of loyalty points and the minimal point balance may be insufficient to obtain any desired reward item. Additionally, even if a consumer obtains a sufficient point balance with a particular sponsoring company, the consumer may not be interested in redeeming the points for any of the limited reward items offered by the company, the consumer may forget or ignore the existence of the point balance and/or the consumer may not desire to spend the time reviewing the reward items or completing the redemption information. In these exemplary situations, the loyalty point account may only be rarely used or may remain inactive.

The sponsoring company often maintains hundreds or thousands of loyalty point accounts for current and past consumers; however, possible public relations, marketing and legal implications exist with a sponsoring company simply canceling certain loyalty point accounts or setting expiration dates on points. As such, the sponsoring company usually continues to maintain the rarely used or inactive loyalty point accounts. However, accounting and legal guidelines typically require a sponsoring company to include all of the loyalty point balances, including balances from the rarely used loyalty point accounts, as liabilities on its accounting statements. As such, a need exists for a system and method for reducing or eliminating certain loyalty account balances and providing certain consumers with new ways to aggregate and redeem loyalty point balances.

Furthermore, portions of each of the above-described programs may be used to induce customer loyalty to particular merchants or service providers who directly provide goods or services to the consumer. In other words, these prior art frequency awards programs provide a means for retail businesses, financial institutions, and others in direct contact with the customers they service to provide incentives to their customers to encourage repeat and/or volume business. However, these programs do not sufficiently address the similar needs of businesses that are further up in the distribution chain, such as manufacturers, to promote volume purchases by customers based upon, for example, brand loyalty independent of the retail source for the purchase. Additionally, the prior art programs do not provide a means for monitoring, tracking, and/or analyzing consumer and product data across distribution channels for a particular manufacturer and/or the variety of goods which that manufacturer places into the stream of commerce for ultimate sale to consumers by a retailer.

Generally, before a product arrives at a retail establishment for sale to a consumer, the product travels through a distribution chain which originates with the manufacturer. The manufacturer typically sells its products to a wholesaler who in turn sells those products to various retailers. Most modern retailers implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of inputting or sensing and interpreting a symbol or other indicia related to the product, such as a Universal Product Code (UPC), generally comprising a machine-readable bar code coupled with a human-readable UPC number, that is printed on a label or tag which is placed on each item of merchandise to be purchased. The manufacturer may assign and mark each product that it sells with a UPC. Conventionally, once the product reaches the retailer, the retailer further identifies each product with a Stock Keeping Unit (SKU) number or code as well as other information for identifying a specific item or style of merchandise. The retailer's SKU number may be either an entirely different number used to identify each product (e.g., by style) or a modified version of the manufacturer's UPC number, derived, perhaps, by adding a SKU number to the UPC number for example.

A POS terminal, a kiosk terminal, or a sales person's handheld terminal might be coupled to a store computer system, such as a network server or some other store platform host, which is able to recognize and process UPC and/or SKU information which has been manually keyed-in or sensed and interpreted by a device, such as a barcode reader, coupled to the terminal. The computer system typically includes a database which stores information relating to the retailer's product inventory, such as stocked merchandise, a UPC and/or SKU number for each item of merchandise, and various types of merchandise identification information, such as price, inventory, style, color, size, etc., which is associated with each UPC and/or SKU number. When a customer purchases an item of merchandise, store personnel frequently use an automated terminal to read the barcode markings which are attached to the item. A computer interprets the UPC and/or SKU number comprised by the barcode, accesses the database to determine the price for each item, and maintains a running total of the total transaction price.

One problem that results from the independent identification schemes of the manufacturer and the retailers is that there is no way for the manufacturer to track the quantity of any particular product that each retailer sold. For example, even if a manufacturer obtains all of the SKU numbers representing items purchased from Retailer 1 and Retailer 2 by consumers, the manufacturer has no means for determining which SKU number corresponds to the manufacturer's UPC, since the UPC's and SKU numbers of the various retailers are not tracked and matched.

In view of the foregoing, a need exists for an incentive or loyalty program which overcomes the shortcomings of the prior art. Thus, there is a need for a system and method which provides a universal customer incentive program that networks various levels of the product distribution chain, such as manufacturers, wholesalers, and retailers, to provide incentives to consumers to purchase products not only from a particular merchant or group of merchants but also from particular manufacturers, regardless of the specific merchant who sells the manufacturer's products to the consumer. Additionally, a need exists for a system and method for gathering data which associates particular consumer purchasing behaviors and specific products or product criteria across a manufacturer's distribution channels.

SUMMARY OF THE INVENTION

The present invention provides a method and system for implementing a loyalty program on a network-wide level. In one embodiment, the system and method facilitates a transfer of loyalty points from at least one consumer account associated with a sponsoring company to at least one consumer account associated with a host company. The invention analyzes the loyalty point balances of consumer accounts associated with a sponsoring company, and based upon certain criteria or rules, the system determines particular loyalty point balances which are below a certain threshold amount or which have remained inactive for a certain time period. After determining particular consumer accounts which meet the criteria or rules, the system establishes a new host account in a host system for each qualifying consumer. The system then deducts all or any portion of the remaining loyalty point balance in the particular consumer's sponsored account and credits the corresponding host account with a corresponding loyalty point balance. By transferring the consumer accounts to a host system, the sponsoring company eliminates or reduces the loyalty point balances from its system, thereby reducing the sponsoring company accounting liabilities and providing new options for the consumers to redeem the points.

More specifically, the system and method facilitates acquiring data related to loyalty point balances of consumer accounts associated with a sponsoring company; determining, using the data and rules, consumer accounts which meet the rules; establishing consumer accounts associated with the host company, wherein the consumer accounts correspond to the consumer accounts associated with the sponsoring company that meet the rules; deducting a portion of the loyalty point balance of the consumer account associated with a sponsoring company; and, crediting loyalty point balances of the consumer account associated with the host company. The rules may include, for example, consumer accounts having loyalty point balances which are below a certain threshold amount, consumer accounts which have remained inactive for a certain time period and/or consumer accounts in which consumers, the sponsoring company or the host company requested a transfer of the loyalty points. The system may also credit any portion of the loyalty points to one or more loyalty point accounts in the host company corresponding to the same consumer or different consumer from which the loyalty points were deducted.

BRIEF DESCRIPTION OF THE DRAWINGS

Additional aspects of the present invention will become evident upon reviewing the non-limiting embodiments described in the specification and the claims, in conjunction with the accompanying figures, wherein like numerals designate like elements, and wherein:

DETAILED DESCRIPTION

Figure 1:
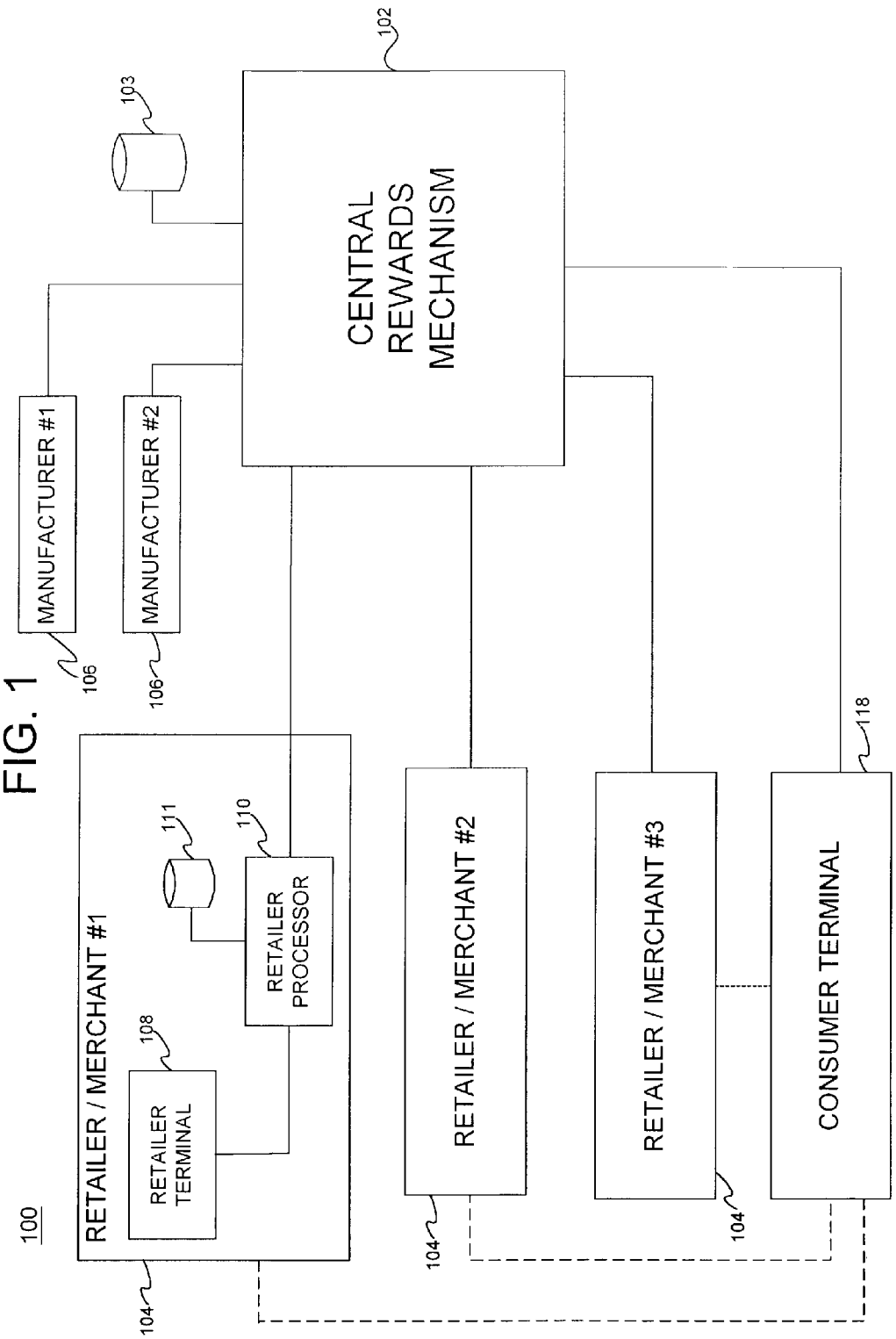
FIGS. 1-3 are schematic block diagrams illustrating exemplary incentive systems in accordance with various aspects of the present invention.

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined solely by the appended claims.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the invention.

Communication between participants in the system of the present invention is accomplished through any suitable communication means, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), etc.), online communications, off-line communications, wireless communications, satellite communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It further will be appreciated that users may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

Each participant or user of the system of the present invention, including purchasers, retailers, manufacturers, and a third-party providers, may be equipped with a suitable computing system to facilitate online communications and transactions with any other participant. For example, some or all participants may have access to a computing unit in the form of a personal computer, although other types of computing units may be used, including laptops, notebooks, handheld computers, set-top boxes, kiosk terminals, and the like. Additionally, other participants may have computing systems which may be implemented in the form of a computer-server, a PC server, a networked set of computers, or any other suitable implementations which are known in the art or may hereafter be devised.

The computing systems may be connected with each other via a data communications network as described more fully above. For example, the network may be a public network, which is assumed to be insecure and open to eavesdroppers. In one embodiment, the network is embodied as the Internet. In this context, the computers may or may not be connected to the Internet at all times. For instance, the consumer's computer may employ a modem to occasionally connect to the Internet, whereas the retailer computing system, the manufacturer computing system, and the central rewards mechanism might maintain a permanent connection to the Internet. It is noted that the network may be implemented as other types of networks, such as an interactive television (ITV) network.

The retailer's computer system may also be interconnected to a third-party provider via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and the Veriphone® networks.

As will be appreciated by one of ordinary skill in the art, the present invention may be embodied as a method, a data processing system, a device for data processing, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" shall interchangeably refer to any person, entity, charitable organization, machine, hardware, software, or business who accesses and uses the system of the invention, including consumers, retailers, manufacturers, and third-party providers. Participants in the system may interact with one another either online or off-line. As used herein, the term "online" refers to interactive communications that takes place between participants who are remotely located from one another, including communication through any of the networks or communications means described above or the like.

The term "manufacturer" shall include any person, entity, charitable organization, machine, software, hardware, and/or the like that manufactures, distributes, or originates a product or service which may ultimately be offered to a consumer directly or indirectly through a retailer. The term "manufacturer" may also include any party that generates and/or provides manufacturer item identifiers. The term "retailer" shall include any person, entity, charitable organization, machine, software, hardware, and/or the like that that offers a product or service to a consumer. As used herein, the term "retailer" is used interchangeably with the term "merchant". Moreover, in this context, a retailer or merchant may offer or sell, either online or offline, products and/or services made or supplied by at least one manufacturer. As used herein, the phrases "network level" and "network-wide level" shall refer to a system that includes more than one retailer and at least one manufacturer.

As used herein, the terms "purchaser", "customer", "consumer", and "end-user" may be used interchangeably with each other, and each shall mean any person, entity, charitable organization, or business which uses a consumer ID to participate in the present system. A "consumer ID", as used herein, includes any device, code, or other identifier suitably configured to allow the consumer to interact or communicate with the system, such as, for example, a rewards card, charge card, credit card, debit card, prepaid card, telephone card, smart card, magnetic stripe card, bar code card, authorization/access code, personal identification number (PIN), Internet code, other identification code, and/or the like. Additionally, a "consumer ID" may comprise any form of electronic, magnetic, and/or optical device capable of transmitting or downloading data from itself to a second device which is capable of interacting and communicating with such forms of consumer ID.

A consumer may register to participate in the present system by any methods known and practiced in the art. For example, a consumer may be enrolled automatically (e.g. if the consumer holds an existing account with the system administrator), over the phone, at the point of sale through a paper application or verbal interview, through the mail, or through instant enrollment online. Consumer enrollment data may comprise any of the following: name; address; date of birth; social security number; email address; gender; the names of any household members; a credit card number for charging any fees that may be associated with participation in the system; survey data; interests; educational level; and/or any preferred brand names. Upon enrollment, the consumer receives a consumer ID. The consumer ID may be associated with a household account which specifies the consumer as a primary member and permits the identification of supplementary members associated with the consumer's household who may also earn reward points for the consumer.

A "consumer profile", as used herein, shall refer to any data used to characterize a consumer and/or the behavior of a consumer. In the context of a commercial transaction, "a consumer profile" shall be understood to include, for example, the time and date of a particular purchase, the frequency of purchases, the volume/quantity of purchases, the transaction size (price), and/or the like. Additionally, in other transactional contexts, the term "consumer profile" shall also be understood to include non-purchase behaviors of a consumer, such as consumer enrollment data, visiting a Web site, referrals of prospective participants in the system, completion of a survey or other information gathering instrument, and/or the like. For instance, a participating online consumer may earn rewards points automatically through a triggering event, such as visiting a Web site, completing an online survey, or clicking on a banner advertisement for example. Offline, a participating consumer may earn rewards points by completing a task or showing their consumer ID to the cashier and triggering the cashier to provide a "behavior" ID which may be input (e.g., by scanning a bar code on a paper survey for example) into the POS terminal. Further, any aspects of the consumer profile may be used in the context of data analysis.

A "third-party provider" may comprise any additional provider of goods and/or services to a consumer. Specifically, a "third-party provider" includes any party other than the particular manufacturer and retailer who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of reward points.

Though the invention may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a manufacturer, the intermediary party as a retailer, the end-user as a consumer, and a good or service as a product or item. However, it will be recognized by those of ordinary skill in the art that the retailer need not provide a product or item to a consumer in exchange for monetary currency. While this often may be the case, the present disclosure is not so limited and includes transactions which may be gratuitous in nature, whereby the retailer transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, retailers, manufacturers, third-party providers, and the like may participate in the system of the present invention.

As used herein, the term "UPC" and the phrase "manufacturer item identifier" shall refer to any symbol or indicia which provides information and, in an exemplary embodiment, shall refer to any number, code, or identifier assigned by a manufacturer and associated with an item, including any type of goods and/or services, ultimately offered to a consumer or other end-user. Colloquially, a UPC is sometimes referred to as a SKU number. However, as used herein, the term "SKU" and the phrase "retailer item identifier" shall refer to any symbol or indicia which provides additional information and, in an exemplary embodiment, shall refer to any number, code, or identifier assigned by a retailer and associated with an item, including any type of goods and/or services, offered to a consumer or other end-user.

"Purchase data", as used herein, comprises data relating to the offer of any item to a consumer or other end-user. Purchase data may include any of the following: an item purchased, an item price, a number of items purchased, a total transaction price, a payment vehicle, a date, a store identifier, an employee identifier, a retailer item identifier, a loyalty identifier, and/or the like.

"Retailer ID", as used herein, comprises any symbol, indicia, code, number, or other identifier that may be associated with a retailer of any type of goods and/or services offered to a consumer or other end-user. A retailer ID may also include or be associated with a "store ID", which designates the location of a particular store. A "manufacturer ID" comprises any symbol, indicia, code, number, or other identifier that may be associated with a manufacturer of any type of goods and/or services ultimately offered to a consumer or other end-user.

An "award" or "reward" may comprise any quantity of products, services, coupons, gift certificates, rebates, reward points, bonus points, credits or debits to a financial instrument, any combination of these, and/or the like.

"Data analysis", as used herein, shall be understood to comprise quantitative and qualitative research, statistical modeling, regression analyses, market segmentation analyses, econometrics, and/or the like. Such analyses may be used to predict consumer behaviors and/or correlate consumer profiles, retailer data, manufacturer data, and/or product or service data.

The system of the present invention associates or maps manufacturer UPC data and retailer SKU data on a network level to reward consumers and/or to analyze the data for a variety of business purposes, such as market segmentation analyses and/or analyses relating to consumer spending behaviors or patterns for example. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the retailer SKU and the manufacturer's UPC, the system permits the standardization of goods and/or services codes at the network level. This standardization not only permits a record of both the specific item purchased and its manufacturer, regardless of the particular retailer involved in the transaction, but it permits the mapping of multiple consumers, multiple goods and/or services, multiple retailers, and/or multiple manufacturers to advantageously cross-market goods and services to consumers.

In accordance with one aspect of the invention, the association of UPC and SKU data by the system facilitates implementation of an incentive or loyalty program by providing a universal rewards currency which may be "spent" by participants who have earned rewards and accepted by the other participants in the multi-tiered network created by the system. The network may comprise any number of participants, including consumers, retailers (and any of their employees), manufacturers, third-party providers, and the like. Each of these categories of participants may be considered a tier in the network, and each participant within the various tiers may design and implement an independent rewards scheme within the context of the universal environment provided by the system. For example, Manufacturer 1 may produce and assign a UPC to Item X. Item X may subsequently be offered for sale by both Retailer 1 and Retailer 2. Retailer 1 and Retailer 2 may then each assign an independent SKU number to Item X to facilitate their own tracking, inventory, and pricing schemes. A consumer may then purchase Item X from both Retailer 1 and Retailer 2.

Since the system is capable of processing, associating, and quantifying a variety of data, including consumer data, employee data, retailer data, manufacturer data, SKU number data corresponding to Item X, and UPC data assigned by Manufacturer 1, for example, this data can then be used by the manufacturer, the retailer, the system administrator, and/or a third-party provider to provide rewards to consumers, employees, retailers, etc. For example, a manufacturer may provide frequency-based incentives, such as every 10th purchase of a particular item will be discounted by 50% for example, independent of and/or in addition to any incentives offered by the specific retailer involved in the transaction. Additionally, the manufacturer may provide sales incentives to the employees of retailers independent of and/or in addition to any employee incentive programs that the retailers may choose to implement.

Since rewards, which may be in the form of rewards points, may be earned across the various tiers in the network, rewards may also be used or spent across the various tiers in the network. Thus, any rewards points that an employee, for example, may earn by promoting a particular manufacturer's line of products, may be "spent" by that employee on goods or services provided by any participant in the network, not merely at the retailer who employs that employee. Likewise, any rewards points earned by a consumer may be spent on goods or services offered by any participant in the network.

In accordance with another aspect of the invention, the association of UPC and SKU data by the system facilitates data analysis on a network level based upon several factors, including any of the following: consumer ID, consumer profile, retailer ID, SKU number, UPC, manufacturer ID, and/or the like. The system may compile any of the above data across multiple participants for the purpose of data analysis, such as analyses which may be employed in strategic planning and marketing for example. The system of the invention may be used to compile, analyze, and report data in a manner which would inform any or all network participants that, for example, a specific consumer (1) has made multiple purchases of particular manufacturers' products; (2) has spent Q dollars over a certain time period (3) at specific multiple retailers; and (4) of the purchases made, R dollars went towards the purchase of Product 1, S dollars went towards the purchase of Product 2, and T dollars went towards the purchase of Service 1. Moreover, the system may be used to compile, analyze, and report data that enable a retailer, a manufacturer, and/or a third-party provider to create a variety of targeted marketing promotions, such as, for example, (1) marketing Product 1 offered by Manufacturer 1 to consumers who purchase Product 2 offered by Manufacturer 2; (2) marketing Product 1 offered by Manufacturer 1 and sold by Retailer X to consumers who purchase Product 2 offered by Manufacturer 2 at Retailer Y; (3) marketing Product 1 offered by Manufacturer 1 and sold by Retailer X to consumers who purchase Product 2 offered by Manufacturer 2 at Retailer Y five times a year. It will be appreciated that these are but a few of the many possible applications for data gathered and generated by the system of the present invention.

In accordance with a further aspect of the invention, the system administrator may allocate rewards points to participants in the system. In one embodiment, participating retailers and/or manufacturers may purchase points from the system administrator and the points are then allocated to an account associated with the retailer and/or manufacturer. In an alternate embodiment, the system administrator may give or donate points to participating retailers and/or manufacturers. The system administrator maintains an account with each of the participating retailers and manufacturers and tracks available points balances and/or balances owing on a rolling basis. The points purchased by the retailers and/or manufacturers may then be earned by and issued to consumers in a manner that is predetermined by the retailer and/or manufacturer involved in the transaction with the consumer. For example, Retailer 1 may purchase 10,000 points from the system administrator and then offer consumers 1 point for every $10 dollars spent in Retailer 1's store or, perhaps, some number of points for every fifth transaction in the store. Moreover, Manufacturer 1, who produces the product offered by Retailer 1, may also purchase points from the system administrator. Thus, when a consumer purchases Manufacturer 1's product at Retailer 1, Manufacturer 1 may issue some number of points to the consumer. The issuance of points, either by retailers or manufacturers, may be based upon any selected criteria, including a points-for-dollars ratio, a defined quantity of points per item or per transaction, some combination of these, and/or the like.

The system administrator maintains an account for each participating consumer and apprises the consumer of the points totals and account activity. The consumer may review the total number of points in the account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, these points are accrued across retailers and/or manufacturers, and points redemption takes place through a single, universal catalog of rewards.

In accordance with the present invention, FIG. 1 is a diagram illustrating an exemplary embodiment of an incentive or loyalty system 100. System 100 comprises a central rewards mechanism 102; a plurality of retailer/merchant systems 104; and at least one manufacturer 106. One skilled in the art will appreciate that system 100 may comprise any number of retailer systems 104 and any number of manufacturers 106.

The central rewards mechanism 102 manages the incentive or loyalty program of the system 100. In an exemplary embodiment, central rewards mechanism 102 receives, processes, and stores manufacturer data, such as information regarding products and/or services and UPC data, transmitted by manufacturers 106 who have enrolled in the system 100. Manufacturers 106 may transmit data to central rewards mechanism 102 in any form and by any means known in the art, including any of the communications means described above. The manufacturer data is stored by the central rewards mechanism 102 in database 103. Database 103 may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database 103 may be organized in any suitable manner, including as data tables or lookup tables.

The central rewards mechanism 102 may receive and process consumer ID information and purchase data from any of the retailer systems 104. The central rewards mechanism 102 may also associate a particular consumer ID with the purchase data and a corresponding manufacturer item identifier. In one embodiment, the central rewards mechanism 102 performs an analysis involving any of the following: a consumer ID, purchase data, a points ratio, a consumer profile, a retailer ID, and a manufacturer ID. The analysis may be dependent upon an the association of the consumer IDs, the purchase data, and the manufacturer item identifier. The analysis may further comprise, for example, a calculation of rewards points and/or other analyses for purposes of market segmentation, determining consumer spending behavior, correlating spending behavior and consumer demographics, and/or the like, as described in greater detail above.

In one exemplary embodiment, the central rewards mechanism 102 stores and informs a consumer of the rewards points that have been earned by a particular transaction as well as accumulated over time. The number of rewards points calculated and awarded by the central rewards mechanism 102 for a particular purchase may depend upon a predetermined rewards ratio. The rewards ratio may be determined by the retailer, the system administrator, the manufacturer of the purchased item, and/or any other suitable third-party. For example, if a participating consumer buys a product from a retailer for $100 and if the retailer rewards ratio is one reward point for each dollar of the purchase price (i.e., one-for-one), once the consumer's consumer ID is identified by the system, the consumer is credited with a suitable number of rewards points from the retailer, which, in this case, would be 100 points. However, if the manufacturer also chooses to issue rewards points for the item purchased, the manufacturer may select a points ratio that is different from the retailer's selected ratio. In the illustrated example, if the manufacturer's selected points ratio is two-for-one, then the consumer will be awarded an additional 200 points from the manufacturer for this single $100 purchase. In this manner, the system of the invention may provide "earn accelerators" through which consumers may accumulate rewards points at comparatively rapid rate. In other words, a single purchase may generate rewards points for a consumer from any or all of a retailer, a manufacturer, and/or a third-party provider, and those rewards points may be used as rewards currency by the consumer throughout the network established by the system of the invention.

In an exemplary embodiment, retailer system 104 comprises a retailer terminal 108 and a retailer processor 110 in communication with database 111. Retailer terminal 108 comprises any device capable of identifying a consumer ID. Exemplary devices for identifying a consumer ID may include a conventional card reader which recognizes a magnetic stripe or bar code associated with a consumer ID, a biometric device, a smart card reader which recognizes information stored on a microchip integrated with a consumer ID, and any device capable of receiving or uploading consumer ID data transmitted electronically, magnetically, optically, and/or the like. In one embodiment, retailer terminal 108 and retailer processor 110 are co-located at a retail store. In another embodiment, retail terminal 108 and retailer processor 110 are remote from each other.

Figure 2:
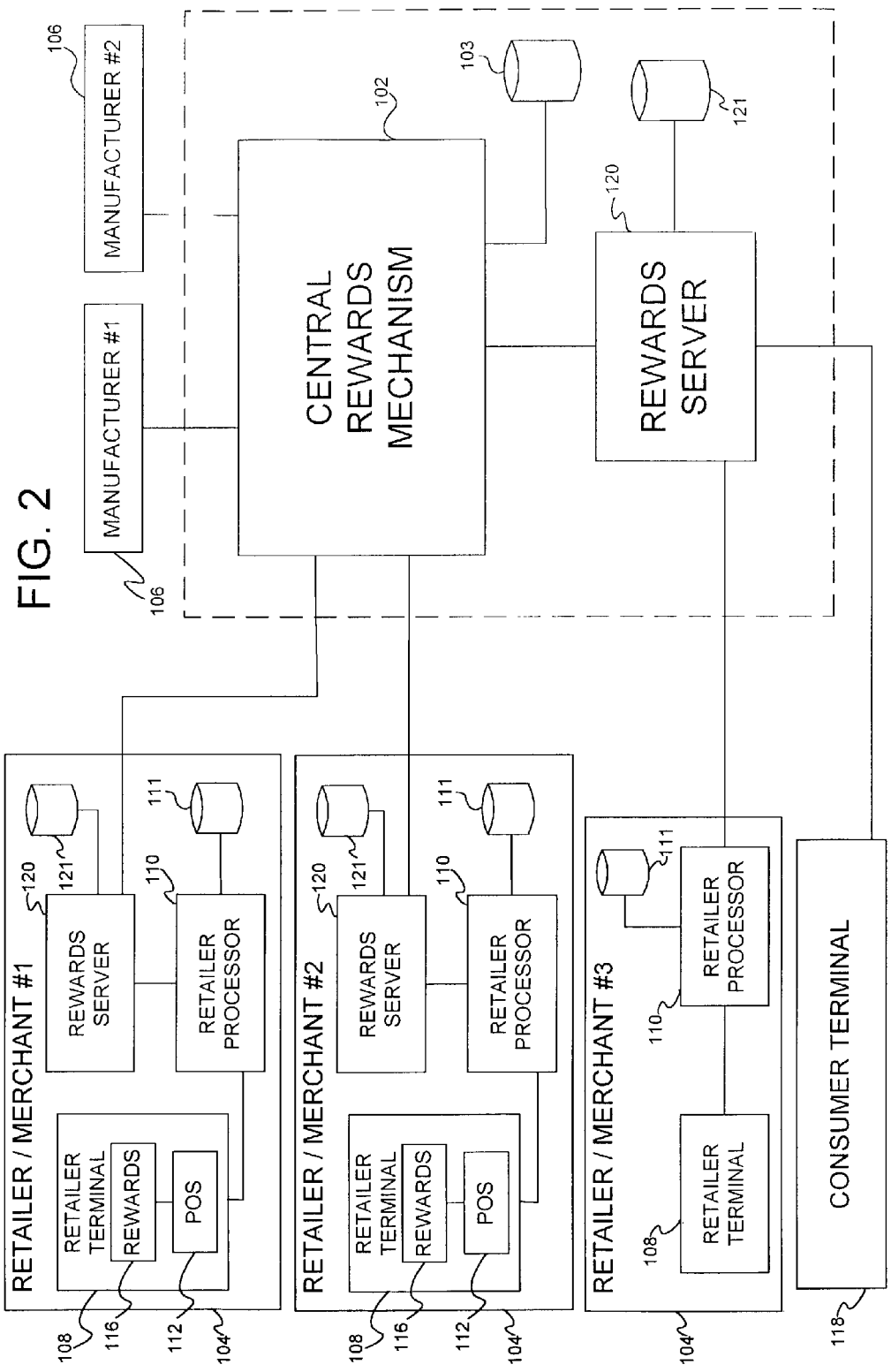

In an exemplary embodiment, as illustrated in FIG. 2, retailer terminal 108 comprises a retailer POS terminal 112, such as a cash register for example. When a consumer ID is used at the time an item is purchased, purchase data, including a SKU number, is input, sensed, or otherwise recognized by terminal 108, and then the purchase data is processed and stored by retailer processor 110. Retailer processor 110 comprises or is in communication with a suitable database 111 or other storage device for maintaining and storing purchase data and any other suitable retailer information. Database 111 may be any type of database, such as any of the database products described above for example. Database 111 may be organized in any suitable manner, including as data tables or lookup tables. Purchase data that is stored in database 111 is available to the retailer's local back office system (not shown) for inventory, accounting, tax, data analysis, and other purposes. The captured purchase data may include the item purchased, the item's unit price, the number of items purchased, the date, the store location, an employee ID, and any other information related to the purchase. In an exemplary embodiment, retailer processor 110 may also receive, process, and store manufacturer data, such as information regarding products and/or services and UPC data, from manufacturers 106 who have enrolled in the system 100. The manufacturer data may be stored in any suitable form, including data tables or lookup tables.

Figure 3:
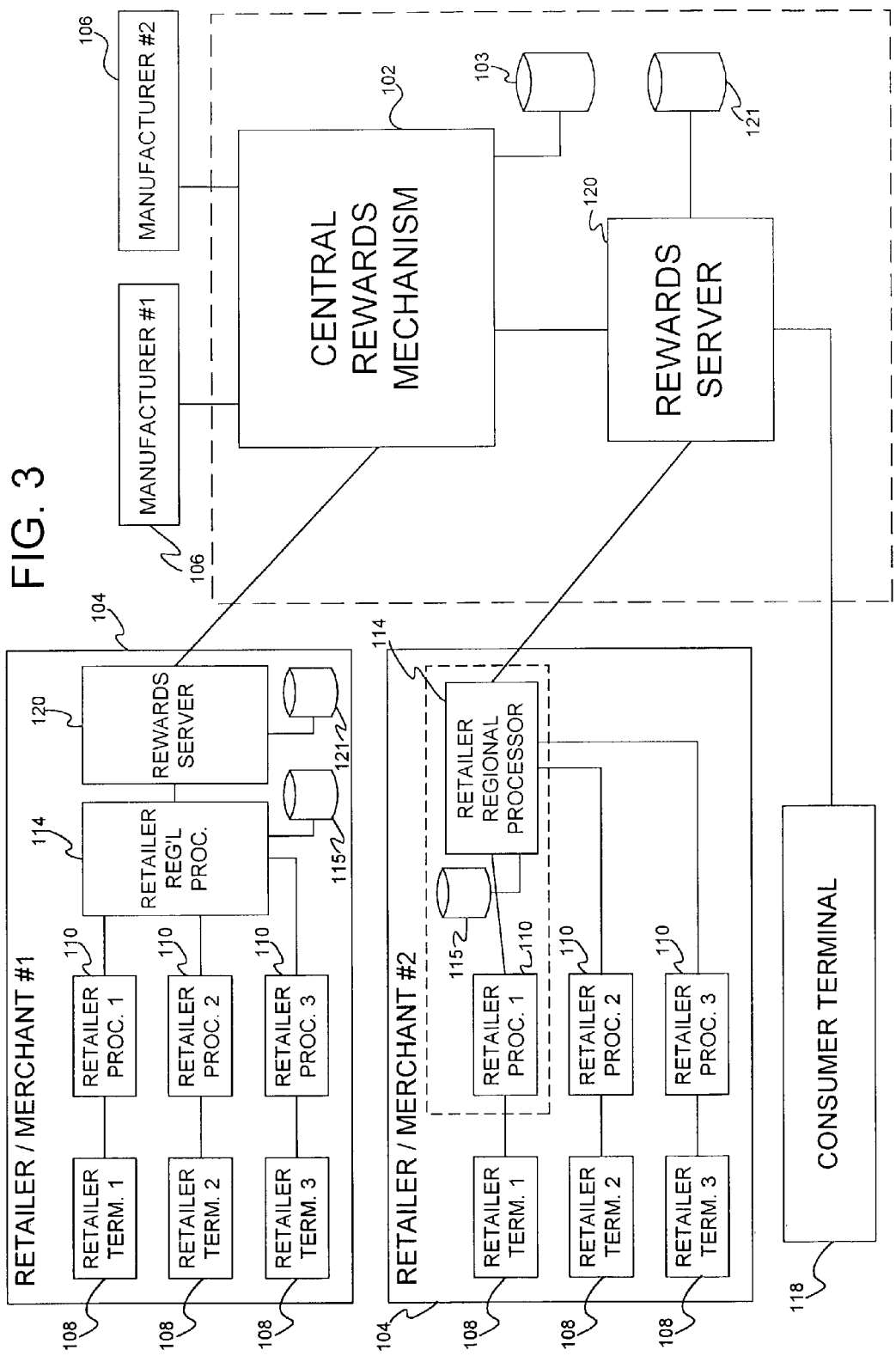

In accordance with the exemplary embodiments illustrated in FIG. 3, purchase data may also be transmitted to and stored and processed by a retailer regional processor 114 (or, alternatively, a retailer national database (not shown)) in communication with database 115 for the purpose of further back office and cumulative data analysis. Database 115 may be any type of database, such as any of the database products described in greater detail above for example. Database 115 may be organized in any suitable manner, including as data tables or lookup tables. In an exemplary embodiment, retailer processor 110 optionally may be integrated with retailer regional processor 114 (illustrated by the phantom lines encompassing Retailer Processor 1 and retailer regional processor 114 within the system of Retailer/Merchant #2), thereby forming a single device. In another embodiment, retailer processor 110 and retailer regional processor 114 are separate devices which may be either co-located with each other or remotely located from one another. For example, in one embodiment, retailer processor 110 and regional processor 114 are co-located at a particular retail store. In another embodiment, retailer processor 110 is located at a particular retail store and retailer regional processor 114 is remotely located at a regional office.

Regardless of the location of retailer regional processor 114, retailer regional processor 114 receives and processes similar information from each of the retailer processors 110 associated with each of the retail stores owned by the same retailer. Whether the system 100 comprises a retailer regional processor 114 or a retailer national processor may be a function of the number of stores maintained by a particular retailer. That is, a larger retailer who has numerous stores throughout the country, for example, may choose to have a plurality of regional processors, while a smaller retailer with a few stores scattered across the country may be better served by a single, national processor. In exemplary embodiments, the retailer regional processors 114 and/or national processors communicate with a suitable database 115 or other storage device which is configured to store and maintain purchase data and any other suitable retailer information. In another exemplary embodiment, retailer regional processor 114 may receive, process, and store manufacturer data, such as information regarding products and/or services and UPC data, from manufacturers 106 who have enrolled in the system 100.

The manufacturer data may be stored in any suitable form, including data tables or lookup tables.

With momentary reference to FIG. 2, retailer terminal 108 may comprise a rewards terminal 116 through which a consumer may be updated with regard to various aspects of the system. For example, rewards terminal 116 may inform a consumer of the number of reward points that they have accumulated from all system participants and the types of awards that may be obtained using those reward points. Moreover, rewards terminal 116 may suggest to the consumer various awards for which the consumer is eligible based upon the rewards points generated by the consumer's network-wide purchases. In this context, network-wide purchases include any purchases of items corresponding to retailers and/or manufacturers participating in the system 100.

In an exemplary embodiment, rewards terminal 116 operates in real-time. In this context, "real-time" means that reward points are immediately, or nearly immediately, updated at the time purchases are made and are therefore immediately redeemable by the consumer at the a point of sale. Thus, for example, a consumer may be informed by rewards terminal 116 at the point of sale that the item being purchased by the consumer may be purchased using the consumer's accumulated reward points, including points accumulated on a network level. Points accumulated on a network level enable consumers to accumulate points more rapidly than would be possible if only a single retailer or group of retailers were issuing the points. In one embodiment, rewards terminal 116 may update a consumer's rewards points in real-time and, in response to the consumer's particular points total, issue a coupon, a gift certificate, and/or additional bonus points to the consumer.

In another exemplary embodiment, the system may operate in batch mode, wherein points totals are calculated, stored, and periodically updated for access by the retailer terminal 108, including POS terminal 112 and/or rewards terminal 116. Thus, in this embodiment, the consumer may be notified of available points sometime after a purchase, or a suggestive sale may take place after a purchase. The total point count or suggestive sale may take into account points generated and accumulated as the result of network-wide purchases.

In various alternate embodiments of the invention, retailer terminal 108 may include a rewards terminal 116 but not a POS terminal 112; a POS terminal 112 but not a rewards terminal 116; or a POS terminal 112 in communication with a rewards terminal 116. In alternate embodiments, where terminal 108 includes a POS terminal 112 and a rewards terminal 116, the two terminals 112 and 116 may be variously implemented as separate terminals, integrated terminals, or software within a device. In another embodiment, where terminal 108 comprises a rewards terminal 116 but not a POS terminal 112, terminal 108 may be a kiosk terminal located within a retail store or some other remote terminal which is capable of recognizing a consumer ID and communicating with the system 100. A consumer may use independent rewards terminal 116 to do, for example, any of the following: view accumulated reward points totals; view potential awards which the consumer may obtain in exchange for various numbers of points; select an award; redeem rewards points for a selected award; request and/or receive a reward points advisory statement; and/or view a directory of participating retailers, manufacturers, and third-party providers.

In another exemplary embodiment, system 100 further comprises a consumer terminal 118. Consumer terminal 118 is any remote terminal through which a consumer may access other aspects of the system 100. Consumer terminal 118 may comprise any of the input devices, computing units, or computing systems described above. Further, consumer terminal 118 communicates with the system 100 through any of the communications networks described above. In one embodiment, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may uses consumer terminal 118 for a variety of purposes. In one embodiment, consumer terminal 118 may be used to communicate with and receive information from the central rewards mechanism 102. For example, a consumer may use consumer terminal 118 to do any of the following: enroll in the system; receive statements or reports regarding accumulated reward points totals; receive bonus details; view potential awards which the consumer may obtain in exchange for various numbers of points; select an award; receive redemption information; view points adjustments; redeem rewards points for a selected award; request and/or receive a reward points advisory statement; receive information regarding where and how points were earned and/or how points were redeemed; receive information regarding expiration dates for points earned; receive information relating to any applicable fees; receive information regarding marketing promotions; and/or view a directory of participating retailers, manufacturers, and/or third-party providers.

In another embodiment, consumer terminal 118 may be used to interact with and/or make purchases and generate rewards points from participating online retailers, as illustrated by the various phantom lines in FIG. 1. The online retailer may then communicate with the central rewards mechanism 102 to transmit and process a consumer ID, purchase data, etc., as described above with reference to retailer 104 of FIG. 1. Information communicated between the online consumer, the online retailer, and the online central rewards mechanism may include, for example, product or service information, prices, availability of the product or service, shipping information, rewards points information, available awards, information regarding points ratios and points redemption, and/or the like. In one embodiment, consumer terminal 118 operates in real-time, as described above with respect to rewards terminal 116. In another embodiment, the consumer terminal 118 may operate in batch mode, as described above. In still a further embodiment, consumer terminal 118 operates in a manner which includes aspects of both real-time functionality and batch mode functionality.

In accordance with a further aspect of the invention, the system 100 may comprise a rewards server 120 in communication with a database 121, as illustrated in FIG. 2. Database 121 may be any type of database, such as any of the database products described above for example. Database 121 may be organized in any suitable manner, including as data tables or lookup tables. In an exemplary embodiment, rewards server 120 may be any hardware and/or software that is configured to communicate with the central rewards mechanism 102 and either the retailer processor 110 or the retailer regional processor 114. In alternate exemplary embodiments, rewards server 120 may be integrated with retailer system 104; rewards server 120 may be integrated with central rewards mechanism 102; or rewards server 120 may be separate from both retailer system 104 and central rewards mechanism 102. In a further embodiment, the rewards server 120 may communicate with both a retailer national processor (not shown) and the central rewards mechanism 102.

In an exemplary embodiment, rewards server 120 receives, processes, and stores both manufacturer data and retailer data. Manufacturer data may include descriptions of products and/or services and UPC data transmitted from manufacturers 106 who have enrolled in the system 100. The manufacturer data may be stored in any suitable form, including data tables or lookup tables. Retailer data may include descriptions of products and/or services and SKU data transmitted from retailers 104 who have enrolled in the system 100. The retailer data may be stored in any suitable form, including data tables or lookup tables.

In an exemplary embodiment, the rewards server 120 performs a plurality of functions that might otherwise be performed by the central rewards mechanism 102. For example, since rewards calculations require significant processing and memory resources, performance of calculations processing by the rewards server 120 at the regional level lessens the processing load on the central rewards mechanism 102, thereby increasing the efficiency of the central rewards mechanism 102. In an exemplary embodiment, each retailer's region, which comprises a plurality of that retailer's stores or outlets, accesses a rewards server 120 which acts as an intermediary between the retailer regional processor 114 and the central rewards mechanism 102. This configuration relieves the processing, power, memory, and other requirements of the central rewards mechanism 102. Moreover, each retailer is but one of many retailers that may participate in the network level rewards structure. Accordingly, a plurality of rewards servers 120 may be in communication with the central rewards mechanism 102 as well as each of the participating retailer regional processors 114, further alleviating the processing burden and freeing up the resources of the central rewards mechanism 102.

Implementations which include at least one independent rewards server 120 are also advantageous because cost-effective communications links may be used to facilitate communications with the central rewards mechanism 102. Performance by the rewards server 120 of many of the "intelligence functions" of the system 100, permits transmission of only particular forms of purchaser information to the central rewards mechanism 102. In an exemplary embodiment, data sent from the rewards server 120 to the central rewards mechanism 102 may include the consumer ID and the total number of rewards points earned by a consumer in a particular transaction. In another exemplary embodiment, data transmitted by the rewards server 120 to the central rewards mechanism 102 may also include any pre-selected aspect of the consumer profile, any pre-selected aspect of the purchase data, and/or any other pre-selected data associated with a consumer, a retailer, a manufacturer, and/or a third-party provider. Pre-selection of the types of data transmitted by the rewards server 120 to the central rewards mechanism 102 may be conducted by the system administrator, a retailer, a manufacturer, and/or a third-party provider. Thus, data which may be useful for purposes of data analysis but unrelated to the rewards feature, such as the characteristics of the particular item purchased for example, may not need to be transmitted to the central rewards mechanism 102.

Exemplary functions performed by the rewards server 120 may include the association of UPC and SKU data; manipulation of the rewards criteria applicable in particular cases, which may further depend upon the retailer, manufacturer, and/or third-party provider involved in a specific transaction with a consumer; calculation of rewards benefits earned by the consumer; filtration functions for determining which data is transmitted from the rewards server 120 to the central rewards mechanism 102; and/or various types of data analyses, as described above. In an exemplary embodiment, the retailer system 104 houses, maintains, and updates the hardware and/or software of the rewards server 120. In another embodiment, rewards server 120 may be housed, maintained, and updated by the system administrator.

In accordance with another embodiment of the present invention, the system 100 permits an open payment system. Since the invention generally provides that consumer participation in the system is based upon a consumer ID, a purchaser may use any of multiple payment vehicles (such as cash, check, charge card, credit card, debit card, MasterCard®, Visa®, and/or the American Express® Card for example) to make purchases at the various retailers and still participate in the system. Thus, in one embodiment, the consumer ID is independent of any particular payment vehicle, such as a credit card for example.

However, alternate embodiments of the invention may be implemented which associate a consumer ID with a particular payment vehicle, such as a consumer's credit card account, charge card account, debit card account, and/or bank account for example. In this embodiment, the retailer conducting the transaction need only participate in the system to the extent that the retailer provides its SKU data to the system 100, such as to the rewards server 120. In other words, when a consumer ID is associated with an instrument (e.g., a credit card) from a third-party provider, the retailer need not provide a rewards terminal or other terminal capable of processing the consumer ID, since the third-party provider may process the consumer ID as part of the payment transaction. Thus, in this embodiment, rewards benefits may be earned by the consumer on a network-wide level without the retailer's direct participation in the rewards feature (notwithstanding the retailer's participation in transmitting SKU data to the system). Moreover, it will be appreciated that a single consumer ID may be associated with multiple third-party payment vehicles, thereby allowing a consumer to generate rewards points regardless of the particular payment vehicle selected for a particular purchase.

Figure 4:
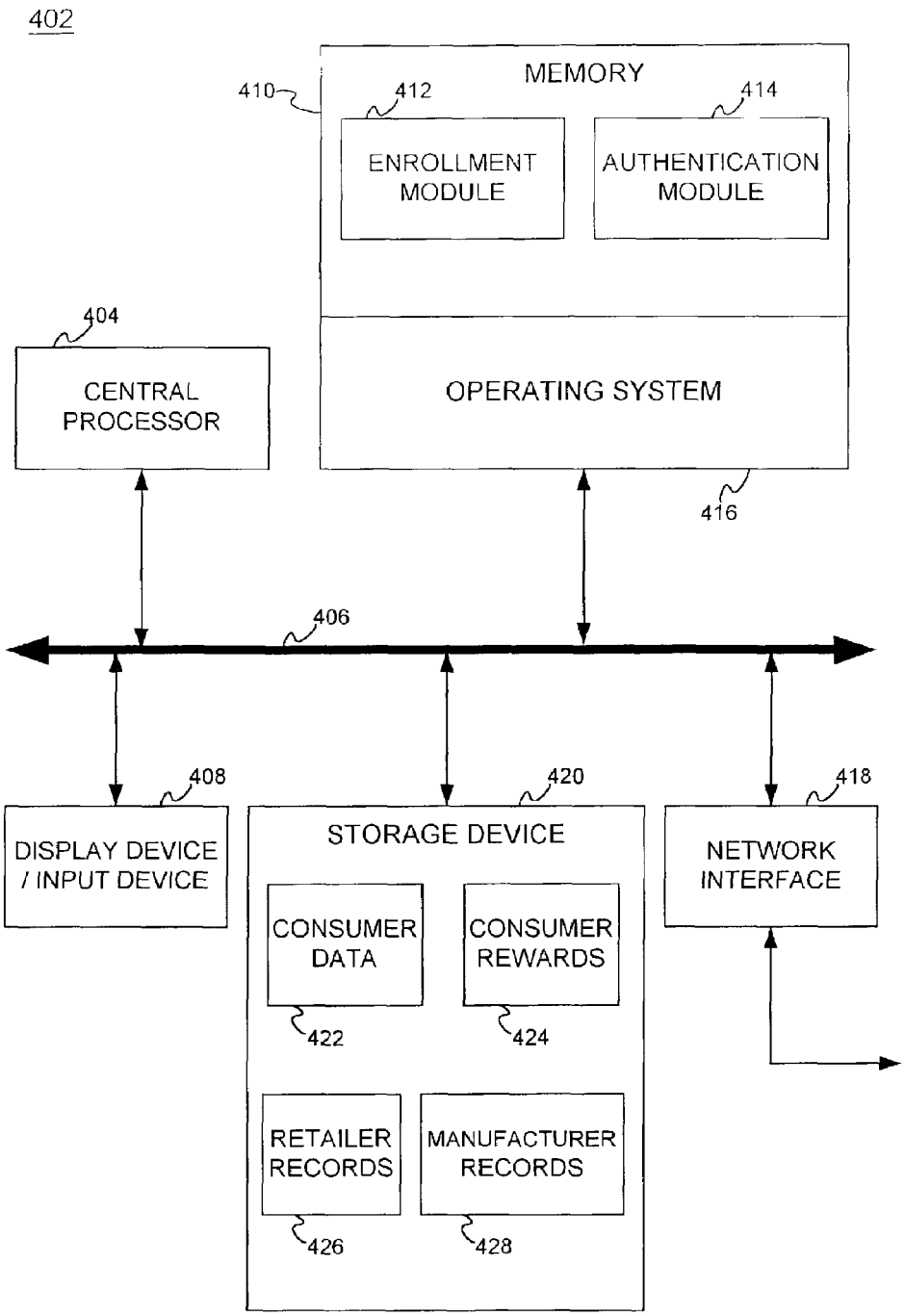
FIG. 4 is a schematic block diagram of an exemplary central rewards mechanism in accordance with the present invention.

With reference to FIG. 4, an exemplary central rewards mechanism 402 includes a central processor 404 in communication with other elements of the rewards mechanism 402 through a system interface or bus 406. A suitable display device/input device 408, such as a keyboard or pointing device in combination with a monitor, may be provided for receiving data from and outputting data to a user of the system. A memory 410 associated with the rewards mechanism 402 includes various software modules, such as an enrollment module 412 and an authentication module 414 for example. The memory 410 preferably further includes an operating system 416 which enables execution by processor 404 of the various software applications residing at enrollment module 412 and authentication module 414. Operating system 416 may be any suitable operating system, as described above. Preferably, a network interface 418 is provided for suitably interfacing with other elements of the incentive awards system, such as the elements described above with reference to FIGS. 1-3.

Lastly, a storage device 420, such as a hard disk drive for example, preferably contains files or records which are accessed by the various software modules, such as enrollment module 412 and authentication module 414. In particular, consumer data 422 comprises information received from a consumer upon registration with the rewards mechanism 402. Consumer rewards 424 comprises data corresponding to each consumer's rewards account. Consumer rewards 424 may include cumulative rewards points totals as well as historical totals and rewards account activity over time. Retailer records 426 comprises information received from the various participating retailers. Manufacturer records 428 comprises information received from the various participating manufacturers. One skilled in the art will appreciate that the storage device 420 and, therefore, consumer data 422, consumer rewards 424, retailer records 426, and manufacturer records 428 may be co-located with the rewards mechanism 402 or may be remotely located with respect to the rewards mechanism 402. If the storage device 420 is remotely located with respect to the rewards mechanism 402, communication between storage device 420 and rewards mechanism 402 may be accomplished by any suitable communication link but is preferably accomplished through a private intranet or extranet.

Enrollment module 412 receives information from consumers, retailers, and/or manufacturers who wish to participate in the system. Enrollment module 412 accesses and stores information in storage device 420. Authentication and/or validation of the identity and status of participants, including any of the other system components, may be performed by the authentication module 414, which preferably has access to the records residing in storage device 420.

Figure 5:
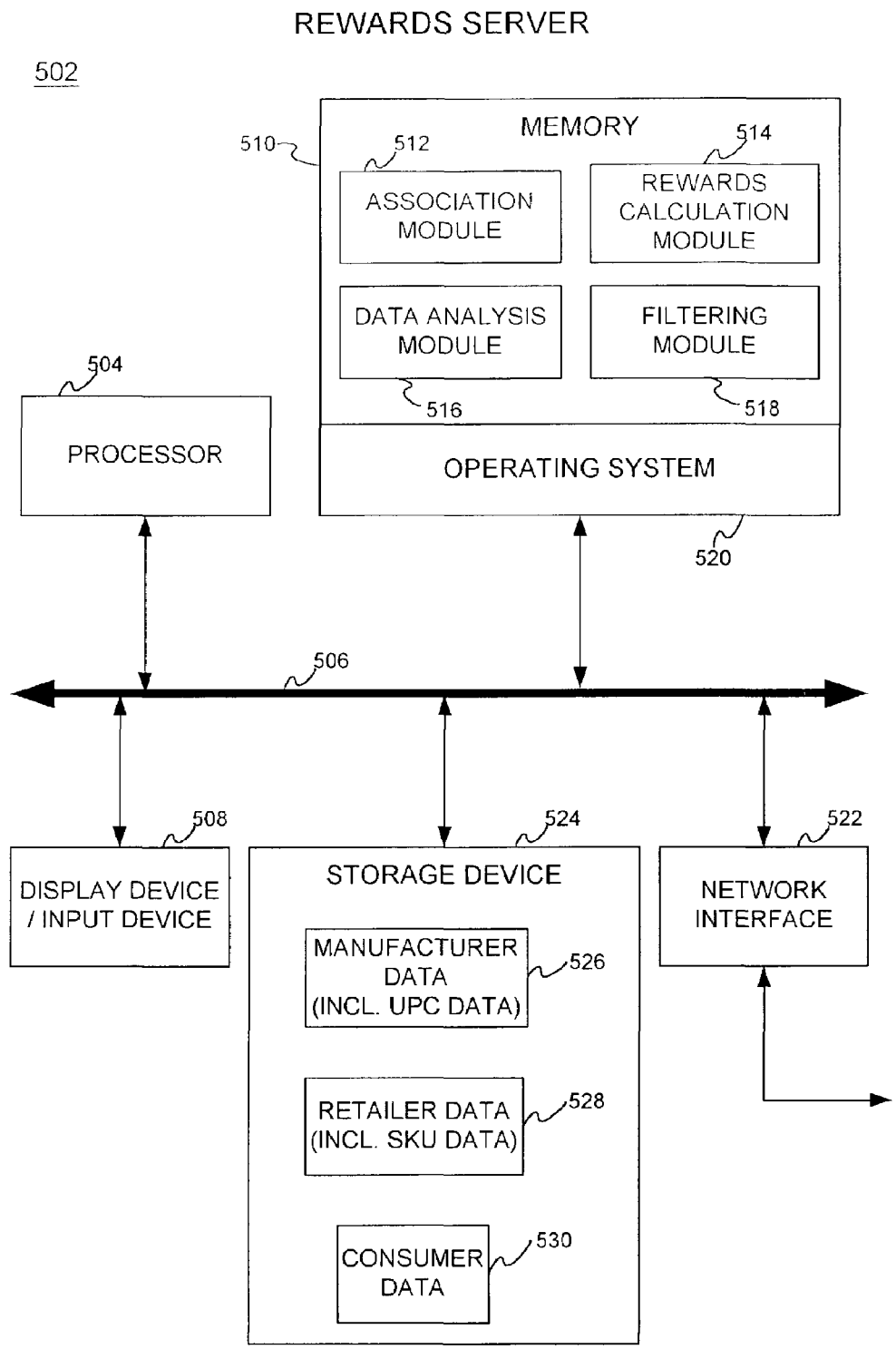
FIG. 5 is a schematic block diagram of an exemplary rewards server in accordance with the present invention.

With reference to FIG. 5, an exemplary rewards server 502 includes a central processor 504 in communication with other elements of the rewards server 502 through a system interface or bus 506. A suitable display device/input device 508, such as a keyboard or pointing device in combination with a monitor, may be provided for receiving data from and outputting data to a user of the system. A memory 510 associated with the rewards server 502 includes a variety of software modules, such as an association module 512, a rewards calculation module 514, a data analysis module 516, and a filtering module 518 for example. The memory 510 preferably further includes an operating system 520 which enables execution by processor 504 of the various software applications residing at the various modules 512, 514, 516, and 518. Operating system 520 may be any suitable operating system, as described above. Preferably, a network interface 522 is provided for suitably interfacing with other elements of the incentive awards system, such as the elements described above with reference to FIGS. 1-3.

Lastly, a storage device 524, such as a database as described above for example, preferably contains files or records which are accessed by the various software modules 512, 514, 516, and 518. In particular, manufacturer data 526 comprises information received from a manufacturer, such as descriptions or other information regarding the manufacturer's products and/or services as well as UPC data for example. Retailer data 528 comprises information received from a retailer, such as descriptions or other information regarding the retailer's products and/or services as well as SKU data for example. Consumer data 530 comprises information pertaining to a consumer, including a consumer ID, purchase data, a consumer profile, and/or the like. One skilled in the art will appreciate that the storage device 524 and, therefore, manufacturer data 526, retailer data 528, and consumer data 530 may be co-located with the rewards server 502 or may be remotely located with respect to the rewards server 502. If the storage device 524 is remotely located with respect to the rewards server 502, communication between storage device 524 and rewards server 502 may be accomplished by any suitable communication link but is preferably accomplished through a private intranet or extranet.

Figure 6:
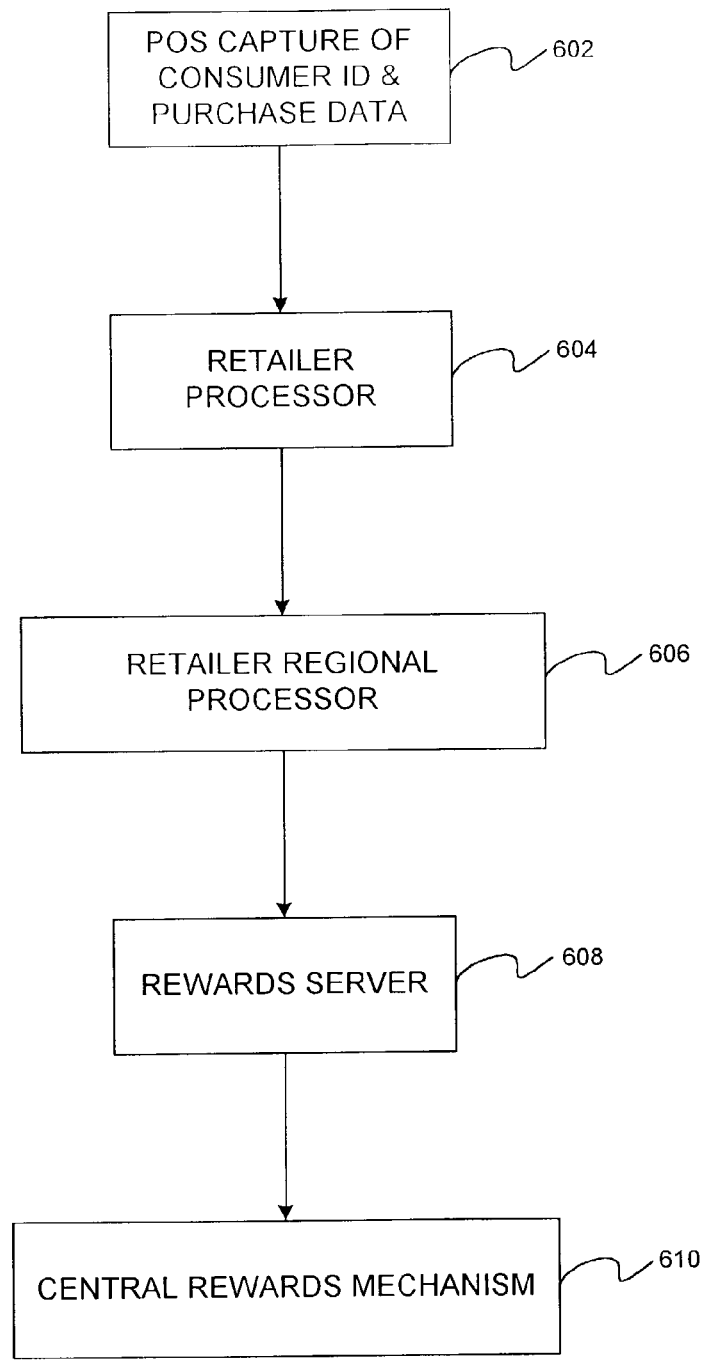
FIG. 6 is a flowchart illustrating an exemplary process for capturing and processing POS SKU data in accordance with the present invention.
Figure 7:
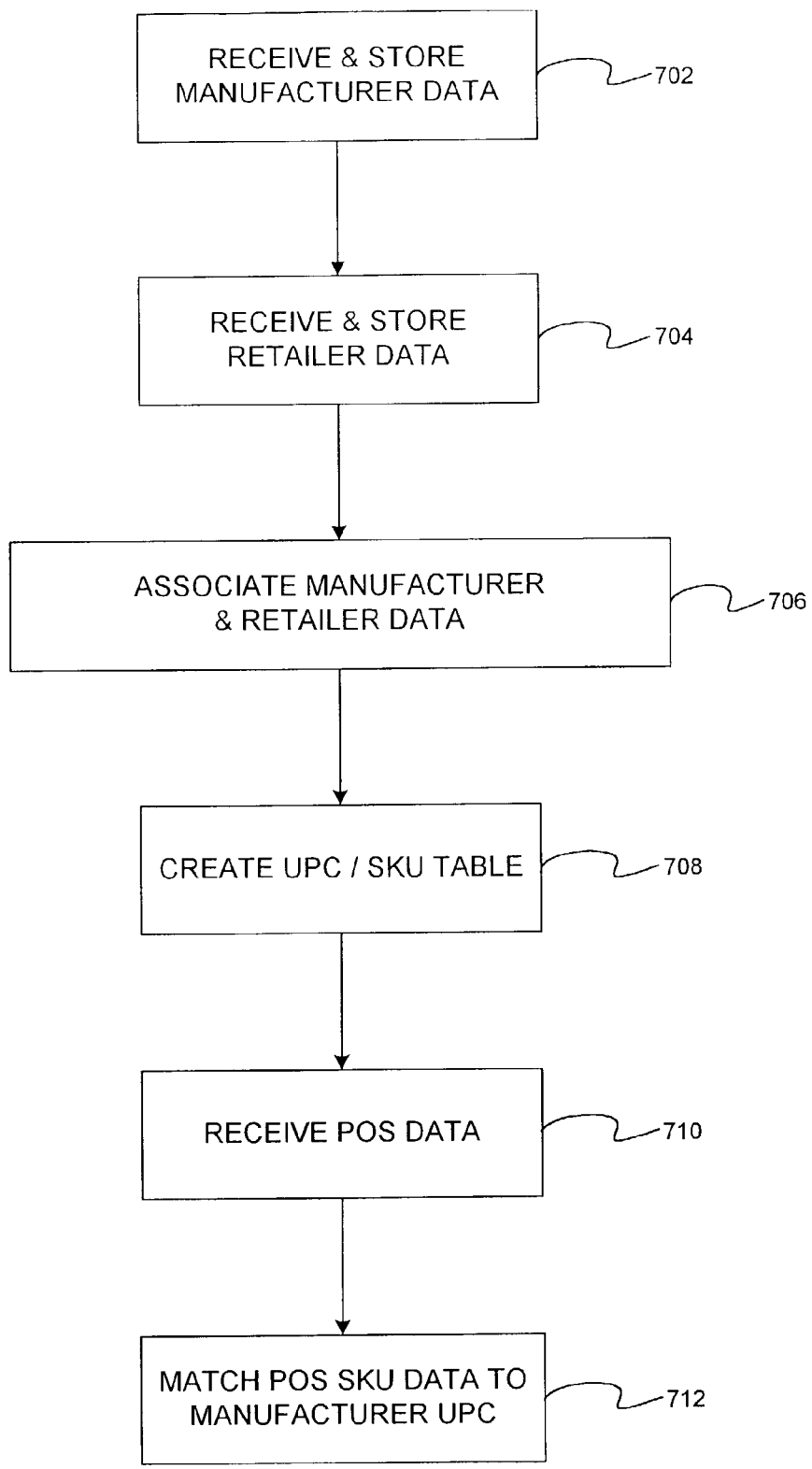
FIG. 7 is a flowchart illustrating an exemplary process for associating SKU data and UPC data in accordance with the present invention.

Referring next to FIGS. 6 and 7, the process flows depicted in these figures are merely exemplary embodiments of the invention and are not intended to limit the scope of the invention as described above. It will be appreciated that the following description makes appropriate reference not only to the steps depicted in FIGS. 6 and 7 but also to the various system components as described above with reference to FIGS. 1-3.

FIG. 6 is flowchart illustrating an exemplary process for capturing and processing POS SKU data in accordance with the present invention. The association or matching of UPC and SKU data begins with POS data capture (step 602). When a consumer presents a consumer ID to a retailer 104 at the time of purchasing an item from the retailer 104, the consumer ID is processed by a rewards terminal 116 that recognizes the consumer ID and identifies the consumer as a participant in the system 100. Purchase data is captured by the retailer POS terminal 112. Purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a POS terminal ID to identify the particular terminal conducting the transaction; any retailer-specific incentive program ID; and/or the like. The retailer POS terminal 112 creates a transaction file comprising the consumer data (including a consumer ID) and purchase data (including a SKU number associated with each item purchased), and the transaction file is then stored by the retailer processor 110 in database 111 (step 604).

The various transaction files may be consolidated by the retailer processor 110 and then forwarded to the retailer regional processor 114 (step 606) for further back-office and cumulative data analysis performed by retailer 104.

In an exemplary embodiment, the transaction file is transmitted by either of the retailer processor 110 or the retailer regional processor 114 to the rewards server 120 (step 608). The SKU information for each item included in the transaction file is then matched to or associated with corresponding UPC information which identifies the related manufacturer 106. An exemplary association process is illustrated in the flowchart of FIG. 7. Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like.

In an exemplary embodiment, database 121 receives and stores manufacturer data, including UPC data, from manufacturer 106 (step 702). Database 121 also receives and stores retailer data, including SKU numbers, from retailer 104 (step 704). In an exemplary implementation, database 121 stores manufacturer data in a separate manufacturer data table for each participating manufacturer 106. Each manufacturer data table may comprise a plurality of fields, such as "UPC" and "product description" for example, and a plurality of records, each of which corresponds to an item offered by the participating manufacturer 106. In one embodiment, database 121 stores retailer data in a separate retailer data table for each participating retailer 104. Each retailer data table may comprise a plurality of fields, such as "SKU" and "product description" for example, and a plurality of records, each record corresponding to an item offered by a participating retailer 104.

Data from each of the manufacturer and the retailer data tables is then associated (step 706). The association step may be accomplished by a database merge function, for example, using a "key field" in each of the manufacturer and retailer data tables. A "key field" partitions the database according to the high-level class of objects defined by the key field. For example, a "product description" class may be designated as a key field in both the manufacturer data table and the retailer data table, and the two data tables may then be merged on the basis of the "product description" data in the key field. In this embodiment, the data corresponding to the key field in each of the merged data tables is preferably the same. That is, the product descriptions in the manufacturer data table matches the product descriptions in the retailer data table. However, manufacturer and retailer data tables having similar, though not identical, data in the key fields may also be merged by using AGREP, for example.

The result of the data association step is the creation of a separate data table, such as a UPC/SKU lookup table for example (step 708). Thus, when the rewards server 120 receives the data (e.g., consumer ID and SKU data) captured by the POS terminal (step 710), the rewards server 120 may search the UPC/SKU lookup table for the appropriate SKU number and then match the SKU to the corresponding UPC data (step 712). In an exemplary embodiment, the "SKU" and "UPC" fields in the UPC/SKU data table may be linked by an appropriate pointer. That is, when the rewards server 120 searches the UPC/SKU table and locates the particular SKU that has been captured and transmitted by the POS terminal, the specifically identified SKU datafield uses a pointer to direct the rewards server 120 to the UPC datafield that corresponds to that SKU number. In an exemplary embodiment, the UPC datafield may be linked by one or more additional pointers to other key fields, such as a consumer ID, a retailer ID, a manufacturer ID, and/or a third-party ID. These additional pointers may be used as means for compiling data which may be useful in any of the various data analyses performed by the rewards server 120. In this manner, the association of POS SKU numbers and UPC data may be used to create a context in which standardized, network-wide analyses may be conducted.

In an exemplary embodiment, the rewards server 120 utilizes the association information to calculate the rewards points generated by a consumer's purchase. For example, an appropriate series of pointers leading from a SKU to a UPC to a manufacturer ID may ultimately direct the rewards server 120 to employ a 2-for-1 manufacturer rewards ratio to award a consumer twice as many points as the dollar amount of the consumer's total transaction price. In another exemplary embodiment, an appropriate series of pointers may result in the calculation of rewards points based upon multiple rewards criteria, such as rewards criteria associated with the manufacturer of the item as well as rewards criteria associated with a third-party provider for example.

In a further embodiment, the rewards server 120 may use the association of UPC and SKU number data to analyze a variety of marketing variables across multiple manufacturers and retailers. For example, rewards server 120 may use a series of pointers leading from an SKU to a UPC and then to a "consumer profile" field or table to correlate, for instance, consumer spending behaviors, particular manufacturers, and/or specific products across multiple retailers for example.

In alternative embodiments, association of the UPC data and SKU number may take place at any of the rewards terminal 116, the retailer POS terminal 112, the retailer processor 110, the retailer regional processor 114 (or a retailer national processor), and/or the central rewards mechanism 102.

In one embodiment, the retailer 104 may offer an incentive or loyalty program that is independent from the program offered by the system 100. Alternatively, the retailer 104 may use the system's UPC data for its own internal purposes.

With momentary reference to FIG. 6, in one exemplary embodiment, the consumer ID and the earned rewards information are transmitted to the central rewards mechanism 102 after the rewards server 120 has filtered out consumer data associated with the consumer ID (step 610). In another embodiment, the central rewards mechanism 102 may use the captured and matched UPC information to determine rewards and/or for data analysis.

In another exemplary embodiment, the present invention facilitates the transfer of any portion of loyalty point balances from at least one sponsored account which includes sponsored loyalty points to at least one host account associated with a particular host. As used herein, a "sponsoring company" includes any person, entity, software and/or hardware that facilitates the issuing of points to its consumers including a company (e.g., hotel, airline, car rental, transaction card issuer) and/or parent organizations, joint ventures, affiliates, subsidiaries, co-marketers, co-sponsors, divisions and/or any related entities. As used herein, "sponsored loyalty points" include loyalty points associated with a sponsoring company. The sponsoring company may operate and sponsor a loyalty program by allowing consumers to earn loyalty points associated with the sponsoring company. The sponsoring company also maintains one or more loyalty point accounts for each consumer, wherein the system stores a balance of the sponsored loyalty points earned by the particular consumer. The loyalty point balance may be stored as a point total, a number, a letter, a level, a code, a value and/or the like. The system for operating the loyalty program and maintaining the loyalty point balances may include any of the hardware and/or software discussed herein that is suitably configured to perform the disclosed operations. A "host" includes any person, entity, software, and/or hardware that receives the transferred loyalty points, facilitates the transfer of loyalty points and/or aggregates loyalty points associated with the same consumer. The host company may be another sponsoring company.

In one embodiment, the system and method facilitates acquiring data related to loyalty point balances of consumer accounts associated with a sponsoring company. The sponsoring company may acquire its own data and conduct its own database analysis and/or allow the host company or consumer to acquire and/or analyze the sponsoring company accounts. The system may acquire the data in any form suitable for analysis and the data may include, for example, consumer name, consumer ID, registration date, consumer transaction data, purchases which qualify for points, time and date of points earned, amount of points earned for each transaction, point balance history, current point balance, time period since last points earned, time period since last conducting a transaction with the particular sponsor and/or the like.

The consumer, sponsoring company and/or host company may establish certain rules or criteria for determining which sponsored accounts should participate in the transfer of points, the portion of points that are transferred, and which host accounts should be credited with the transferred points. The rules may include, for example, consumer accounts having loyalty point balances which are below a certain threshold amount, consumer accounts which have remained inactive for a certain time period and/or consumer accounts in which consumers, the sponsoring company or the host company requested a transfer of the loyalty points. For example, the system may store a rule that flags any account associated with the sponsoring company that includes less than 500 points. Moreover, the system may allow a consumer to enter a webpage or call a customer service representative to request that the consumer's own account be flagged such that the system will transfer (e.g., debit and credit as discussed herein) any requested number of loyalty points to the host account associated with the consumer. The transfer of points may occur at any predetermined time periods, certain dates, random dates and/or only at a requested time. The amount of points to transfer may include a set amount of points, all of the points, any subset of points, an increasing amount of points, a decreasing amount of points and/or an amount of points based upon a certain formula, event or non-event (e.g., transfer 500 points for each month the consumer does not rent a car from a particular rental company).

The system may also credit any portion of the loyalty points to one or more loyalty point accounts in the host company corresponding to the same consumer or a different consumer from which the loyalty points were deducted. For example, the consumer may request that the loyalty points be transferred to an account at the host associated with a family member, a friend, a charitable organization and/or the like. In this manner, while the individual consumer accounts include minimal amounts of points which are often insufficient for the individual consumer to utilize for any large reward item, the charitable organization may be able to acquire a large amount of points from numerous consumer accounts in order to obtain larger reward items.

After the system records the desired rules, the system determines which consumer accounts meet the rules. The system may then flag the particular accounts and send a list of consumer accounts which meet the rules to the host system. In one embodiment, the host system may then establish or activate its own consumer accounts, wherein the consumer accounts correspond to the consumer accounts associated with the sponsoring company that meet the rules. In another embodiment, the host system may establish or activate accounts associated with other people or organizations that may receive the transferred points, such as, for example, a United Way account. The system then assigns each account an account number to help coordinate the transfer of loyalty points from the sponsoring company accounts. The system then deducts all or any portion of the loyalty point balance of the consumer account associated with a sponsoring company and credits the corresponding or requested loyalty point balances of the accounts associated with the host company. In one embodiment, the system may notify the consumer of the transfer of the points and/or provide the consumer or the sponsoring company with the option to keep the consumer account open or to close the consumer account with the sponsor. The system may then eliminate, close, or flag as inactive the consumer account associated with the sponsoring company. By transferring the loyalty points from the consumer accounts to the accounts of a host system, the sponsoring company eliminates or reduces the loyalty point balances from its system, thereby reducing the sponsoring company accounting liabilities and providing new options for the consumers to redeem the points or aggregated points in another loyalty program.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method for facilitating a transfer of loyalty points from a consumer account associated with a sponsoring company to a consumer account associated with a host company, said method including:

receiving and storing, by a loyalty computing device, manufacturer item identifiers, wherein said manufacturer item identifiers are received from said manufacturer;

receiving and storing, by said loyalty computing device, retail item identifiers, wherein said retail item identifiers are received from said merchant;

associating and storing, by said loyalty computing device, each of said retail item identifiers with a corresponding one of said manufacturer item identifiers;

receiving and processing, by said loyalty computing device, a purchase transaction, wherein said purchase transaction includes a consumer ID, a merchant item identifier, and a purchase price;

retrieving, by said loyalty computing device, a manufacturer item identifier corresponding to said merchant item identifier;

calculating, by said loyalty computing device, merchant loyalty points based on said consumer ID, said purchase price and a first currency to point ratio corresponding to said merchant item identifier;

calculating, by said loyalty computing device, manufacturer loyalty points based on said consumer ID, said purchase price and a second currency to point ratio corresponding to said manufacturer item identifier;

calculating, by said loyalty computing device, a third set of loyalty points based on said consumer ID, said purchase price and a third currency to point ratio corresponding to affiliated Service Establishment (SE) numbers;

combining, by said loyalty computing device, said merchant loyalty points, said manufacturer loyalty points, and said third set of loyalty points within loyalty account balances associated with said consumer ID;

acquiring, by said loyalty computing device, balance data related to said loyalty point balances of consumer accounts associated with a sponsoring company, wherein said loyalty account balances comprise said manufacturer loyalty points issued by a manufacturer and said merchant loyalty points issued by a merchant, determining, by said loyalty computing device and using said balance data and rules, said consumer accounts that have loyalty point balances below a certain threshold amount;

deducting, by said loyalty computing device, at least a portion of said loyalty point balance of said consumer accounts associated with a sponsoring company that have loyalty point balances below the threshold amount; and, crediting, by said loyalty computing device, loyalty point balances of said consumer accounts associated with said host company that have loyalty point balances below the threshold amount, wherein at least one of said sponsoring company or said host company initiated a transfer of said loyalty points.

2. The method of claim 1, wherein said determining step includes determining said consumer accounts which have remained inactive for a certain time period.

3. The method of claim 1, wherein said crediting step includes crediting said loyalty points to a loyalty point account in said host company corresponding to the same consumer from which said loyalty points were deducted in said deducting step.

4. The method of claim 1, wherein said crediting step includes crediting said loyalty points to a loyalty point account in said host company corresponding to a different consumer from which said loyalty points were deducted in said deducting step.

5. The method of claim 1, wherein said crediting step includes crediting said loyalty points to more than one loyalty point account associated with said host company.

6. A method for facilitating a transfer of loyalty points from a consumer account associated with a sponsoring company to a consumer account associated with a host company, said method including:
  receiving and storing, by a loyalty computing device, manufacturer item identifiers, wherein said manufacturer item identifiers are received from said manufacturer;
  receiving and storing, by said loyalty computing device, retail item identifiers, wherein said retail item identifiers are received from said merchant;
  associating and storing, by said loyalty computing device, each of said retail item identifiers with a corresponding one of said manufacturer item identifiers;
  receiving and processing, by said loyalty computing device, a purchase transaction, wherein said purchase transaction includes a consumer ID, a merchant item identifier, and a purchase price;
  retrieving, by said loyalty computing device, a manufacturer item identifier corresponding to said merchant item identifier;
  calculating, by said loyalty computing device, merchant loyalty points based on said consumer ID, said purchase price and a first currency to point ratio corresponding to said merchant item identifier;
  calculating, by said loyalty computing device, manufacturer loyalty points based on said consumer ID, said purchase price and a second currency to point ratio corresponding to said manufacturer item identifier;
  calculating, by said loyalty computing device, a third set of loyalty points based on said consumer ID, said purchase price and a third currency to point ratio corresponding to affiliated Service Establishment (SE) numbers;
  combining, by said loyalty computing device, said merchant loyalty points, said manufacturer loyalty points, and said third set of loyalty points within loyalty account balances associated with said consumer ID;
  acquiring, by said loyalty computing device, balance data related to said loyalty point balances of consumer accounts associated with a sponsoring company, wherein said loyalty account balances comprise said manufacturer loyalty points issued by a manufacturer and said merchant loyalty points issued by a merchant;
  determining, by said loyalty computing device and using said balance data and rules, said consumer accounts that have loyalty point balances below a certain threshold amount;
  deducting, by said loyalty computing device, at least a portion of said loyalty point balance of said consumer accounts associated with a sponsoring company that have loyalty point balances below the threshold amount; and,
  crediting, by said loyalty computing device, loyalty point balances of said consumer accounts associated with said host company that have loyalty point balances below the threshold amount, wherein an entity initiating the transfer of loyalty points is not a consumer.

7. A tangible computer-readable medium having stored thereon a plurality of computer-executable instructions that, if executed by a computing device, cause said computing device to perform a method comprising:
  receiving and storing manufacturer item identifiers, wherein said manufacturer item identifiers are received from said manufacturer;
  receiving and storing retail item identifiers, wherein said retail item identifiers are received from said merchant;
  associating and storing each of said retail item identifiers with a corresponding one of said manufacturer item identifiers;
  receiving and processing a purchase transaction, wherein said purchase transaction includes a consumer ID, a merchant item identifier, and a purchase price;
  retrieving a manufacturer item identifier corresponding to said merchant item identifier;
  calculating merchant loyalty points based on said consumer ID, said purchase price and a first currency to point ratio corresponding to said merchant item identifier;
  calculating manufacturer loyalty points based on said consumer ID, said purchase price and a second currency to point ratio corresponding to said manufacturer item identifier;
  calculating a third set of loyalty points based on said consumer ID, said purchase price and a third currency to point ratio corresponding to affiliated Service Establishment (SE) numbers;
  combining said merchant loyalty points, said manufacturer loyalty points, and said third set of loyalty points within loyalty account balances associated with said consumer ID;
  acquiring balance data related to said loyalty point balances of consumer accounts associated with a sponsoring company, wherein said loyalty account balances comprise manufacturer loyalty points issued by a manufacturer and said merchant loyalty points issued by a merchant;
  determining, using said balance data and rules, said consumer accounts that have loyalty point balances below a certain threshold amount;
  deducting at least a portion of said loyalty point balance of said consumer accounts associated with a sponsoring company that have loyalty point balances below the threshold amount; and,
  crediting loyalty point balances of said consumer accounts associated with said host company that have loyalty point balances below the threshold amount, wherein at least one of said sponsoring company or said host company initiated a transfer of said loyalty points.

* * * * *

UNITED STATES PATENT AND TRADEMARK OFFICE
CERTIFICATE OF CORRECTION

PATENT NO.       : 7,613,629 B2                                Page 1 of 1
APPLICATION NO.  : 10/304251
DATED            : November 3, 2009
INVENTOR(S)      : Antonucci et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Nineteenth Day of October, 2010

David J. Kappos
*Director of the United States Patent and Trademark Office*